US012769736B2

(12) United States Patent
Kirchenbauer et al.

(10) Patent No.: US 12,769,736 B2
(45) Date of Patent: Oct. 20, 2026

(54) CHARACTERIZATION OF MACHINE-LEARNING MODELS

(71) Applicant: X Development LLC, Mountain View, CA (US)

(72) Inventors: John William K. Kirchenbauer, Arlington, VA (US); David Andre, San Francisco, CA (US); Garrett Raymond Honke, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 19/042,774

(22) Filed: Jan. 31, 2025

(65) Prior Publication Data

US 2025/0321963 A1 Oct. 16, 2025

Related U.S. Application Data

(60) Provisional application No. 63/549,403, filed on Feb. 2, 2024.

(51) Int. Cl.
*G06F 16/2453* (2019.01)
*G06F 16/215* (2019.01)

(52) U.S. Cl.
CPC ...... *G06F 16/24542* (2019.01); *G06F 16/215* (2019.01)

(58) Field of Classification Search
None
See application file for complete search history.

(56) References Cited

U.S. PATENT DOCUMENTS

| | | | | |
|---|---|---|---|---|
| 2020/0226475 | A1* | 7/2020 | Ma | G06N 3/088 |
| 2022/0261434 | A1* | 8/2022 | Yang | G06N 3/08 |
| 2024/0086764 | A1* | 3/2024 | Sonoda | G06N 20/00 |
| 2024/0111794 | A1* | 4/2024 | Osuala | G06F 16/3323 |
| 2024/0160673 | A1* | 5/2024 | Dela Rosa | G06V 20/20 |
| 2024/0249186 | A1* | 7/2024 | Neelakantan | G06N 20/00 |
| 2025/0095424 | A1* | 3/2025 | Müller | G07C 5/008 |
| 2025/0139353 | A1* | 5/2025 | Ordorica de la Torre | G06F 40/169 |

OTHER PUBLICATIONS

Anil et al., "Gemini: a family of highly capable multimodal models," CoRR, Dec. 19, 2023, arXiv:2312.11805, 90 pages.

(Continued)

*Primary Examiner* — Christopher J Raab
(74) *Attorney, Agent, or Firm* — Fish & Richardson P.C.

(57) ABSTRACT

Disclosed herein are systems and methods for objectively characterizing machine-learning models including receiving first training data formatted to be used in the training of a machine-learning model; receiving one or more challenge queries formatted to be run on the machine-learning model; generating, for the first training data, a plurality of associated training vectors that embed at least some of the first training data into a vector space; generating, for each of the one or more challenge queries, a plurality of associated challenge vectors that embed at least some of the challenge queries into the vector space; and determining, for each challenge query, a corresponding quality metric for the machine-learning model by determining a neighborhood density for each of the challenge queries in the vector space.

18 Claims, 18 Drawing Sheets

(56) References Cited

OTHER PUBLICATIONS

Biderman et al., "Datasheet for the pile," CoRR, Jan. 13, 2022, arXiv:2201.07311, 22 pages.
Biderman et al., "Pythia: A suite for analyzing large language models across training and scaling," Proceedings of the 40th International Conference on Machine Learning, 2023, 202:2397-2430.
Gao et al., "The pile: An 800gb dataset of diverse text for language modeling," CoRR, Dec. 31, 2020, arXiv:2101.00027, 39 pages.
Geiping et al., "How much data are augmentations worth? an investigation into scaling laws, invariance, and implicit regularization," CoRR, Oct. 12, 2022, arXiv:2210.06441, 31 pages.
Hendrycks et al., "Aligning ai with shared human values," Proceedings of the International Conference on Learning Representations (ICLR), Jan. 12, 2021, 29 pages.
Hendrycks et al., "Measuring massive multitask language understanding," Proceedings of the International Conference on Learning Representations (ICLR), Jan. 12, 2021, 27 pages.
International Search Report and Written Opinion in International Appln. No. PCT/US2025/014125, mailed on Jul. 17, 2025, 15 pages.
Johnson et al., "Billion-scale similarity search with GPUs," IEEE Transactions on Big Data, Jul. 1, 2021, 7(3):535-547.
Karppa et al., "Deann: Speeding up kernel-density estimation using approximate nearest neighbor search," Proceedings of The 25th International Conference on Artificial Intelligence and Statistics, 2022, 151:3108-3137.
Kirchenbauer et al., "On the reliability of watermarks for large language models," CORR, Jun. 7, 2023, arXiv:2306.04634, 45 pages.
Krishna et al., "Paraphrasing evades detectors of ai-generated text, but retrieval is an effective defense," CoRR, Mar. 23, 2023, arXiv:2303.13408, 32 pages.
Reimers et al., "Sentence-bert: Sentence embeddings using siamese bert-networks," Proceedings of the 2019 Conference on Empirical Methods in Natural Language Processing and the 9th International Joint Conference on Natural Language Processing (EMNLP-IJCNLP), Nov. 2019, pp. 3982-3992.
Rushkin, "Document Similarity from Vector Space Densities," CS, Sep. 1, 2020, arxiv.org/abs/2009.00672, 12 pages.
Tirumala et al., "D4: Improving llm pretraining via document de-duplication and diversification," CoRR, Aug. 23, 2023, arXiv:2308.12284, 36 pages.
Touvron et al., "Llama 2: Open foundation and finetuned chat models," CoRR, Jul. 18, 2023, arXiv:2307.09288, 77 pages.
Wang et al., "Improving text embeddings with large language models," CoRR, Dec. 31, 2023, arXiv:2401.00368, 20 pages.
Wu et al., "Local Density Estimation in High Dimensions," CS, Sep. 20, 2018, arxiv.org/abs/1809.07471, 45 pages.
Yang et al., "Rethinking benchmark and contamination for language models with rephrased samples," CoRR, Nov. 8, 2023, arXiv:2311.04850, 16 pages.
Yauney et al., "Data Similarity is Not Enough to Explain Language Model Performance," Proceedings of the 2023 Conference on Empirical Methods in Natural Language Processing, Dec. 2023, Nov. 23, 2023, pp. 11295-11304.
Zenodo.org/records/5371629 [online], "A framework for few-shot language model evaluation," Sep. 2, 2021, retrieved on Sep. 29, 2025, retrieved from URL<http://www.assaabloy.com/en/com/Press-News/News/2011/NFC-enabled>, 6 pages.

* cited by examiner

Please rephrase the following question without altering its meaning, ensuring you adjust the word order appropriately. Ensure that no more than five consecutive words are repeated and try to use similar words as substitutes where possible. Do not change the format of the multiple-choice question. When encountering mathematical formulas, please try to substitute the variable names. Ensure the formulas aren't identical to the original. When you come across a single number or letter, consider replacing it with a sentence. When encountering a long sequence of numbers, if they are separated by spaces, you can replace the spaces with commas; if separated by commas, you can replace them with spaces. Consider the prompt and choices as a whole; there shouldn't be consecutive words. If options are challenging to rephrase, consider altering the initial letter's case.\n\nOriginal question:\n\n<QUERY>"

<u>ORIGINAL</u>

The following are multiple choice questions (with answers) about sociology.

Marxist feminists explain patriarchy in terms of:

A. a lack of equal rights and opportunities for men and women

B. sex classes, through which men oppress women economically, politically and sexually C. women's domestic labour being exploited by the capitalist economy D. the dual systems of capitalism and male domination Answer:

<u>PARAPHRASED</u>

Below are several multiple-choice inquiries concerning sociology, each provided with answer selections.

How do Marxist feminists interpret the concept of patriarchy?

A. An absence of equivalent rights and opportunities between the genders

B. Gender strata, whereby females are subjugated by males on economic, political, and sexual grounds C. The exploitation of female household work by the system of capitalism D. The twofold structures of capitalist society and masculine hegemony Answer:

FIG. 10

Please rephrase the following question without altering its meaning, ensuring you adjust the word order appropriately. Ensure that no more than five consecutive words are repeated and try to use similar words as substitutes where possible. Do not change the format of the multiple-choice question. When encountering mathematical formulas, please try to substitute the variable names. Ensure the formulas aren't identical to the original. When you come across a single number or letter, consider replacing it with a sentence. When encountering a long sequence of numbers, if they are separated by spaces, you can replace the spaces with commas; if separated by commas, you can replace them with spaces. Consider the prompt and choices as a whole; there shouldn't be consecutive words. If options are challenging to rephrase, consider altering the initial letter's case.\n\nOriginal question:\n\n<QUERY>"

FIG. 10A

ORIGINAL

The following are multiple choice questions (with answers) about sociology.

Marxist feminists explain patriarchy in terms of:

A. a lack of equal rights and opportunities for men and women

B. sex classes, through which men oppress women economically, politically and sexually C. women's domestic labour being exploited by the capitalist economy D. the dual systems of capitalism and male domination Answer:

FIG. 10B

PARAPHRASED

Below are several multiple-choice inquiries concerning sociology, each provided with answer selections.

How do Marxist feminists interpret the concept of patriarchy?

A. An absence of equivalent rights and opportunities between the genders

B. Gender strata, whereby females are subjugated by males on economic, political, and sexual grounds C. The exploitation of female household work by the system of capitalism D. The twofold structures of capitalist society and masculine hegemony Answer:

FIG. 10C

CHARACTERIZATION OF MACHINE-LEARNING MODELS

PRIORITY CLAIM

This application claims benefit from U.S. Provisional Patent Application No. 63/549,403, filed Feb. 2, 2024, which is hereby incorporated by reference.

FIELD OF THE DISCLOSURE

The disclosure relates to machine-learning models and more specifically, to characterization of large language models.

BACKGROUND

With the widespread adoption of web-scale training data, it can be difficult to determine the relationship between outputs from a large language model (LLM) at test time, e.g., at the time of a specific inquiry, and the specific pieces of training data that may have contributed to the output.

SUMMARY

Disclosed herein are systems and methods for characterizing training data utilized in a machine-learning model according to a set of challenge queries. The systems and methods can be used for analyzing test time behavior and performance of a machine-learning model, e.g., a language model, or a large language model.

In general, an aspect disclosed herein is a system for objective characterization of machine-learning models, the system including one or more processors; and computer memory storing instructions that, when executed by the one or more processors, cause the one or more processors to perform operations including receiving first training data formatted to be used in the training of a machine-learning model; receiving one or more challenge queries formatted to be run on the machine-learning model; generating, for the first training data, a plurality of associated training vectors that embed at least some of the first training data into a vector space; generating, for each of the one or more challenge queries, a plurality of associated challenge vectors that embed at least some of the challenge queries into the vector space; and determining, for each challenge query, a corresponding quality metric for the machine-learning model by determining a neighborhood density for each of the challenge queries in the vector space.

Examples may include one or more of the following features. The operations further may include responsive to determining, for each challenge query, a corresponding quality metric for the machine-learning model, retraining the machine-learning model using second training data that may include at least some of the first training data and at least some of the challenge queries. The operations further may include responsive to determining, for each challenge query, a corresponding quality metric for the machine-learning model, selecting the machine-learning model for use in processing at least one of the challenge queries. The operations further may include responsive to determining, for each challenge query, a corresponding quality metric for the machine-learning model, selecting the machine-learning model for use in processing other queries similar to at least one of the challenge queries. The first training data may have been used to train the machine-learning model. The machine-learning model can be a large language model. The first training data may include data in a first format selected from the group including i) natural language strings, ii) image data, and iii) video data. The challenge queries can be in the first format. The operations may further include generating, for the first training data, the plurality of associated training vectors that embed at least some of the first training data into a vector space may include using a first embedding function; and generating, for each of the one or more challenge queries, a plurality of challenge vectors that embed at least some of the challenge queries into the vector space may include using the first embedding function. The plurality of associated training vectors that embed at least some of the first training data into the vector space can embed a statistically representative subsample of the first training data into the vector space. Determining the neighborhood density for each of the challenge queries in the vector space may include determining a count of a number of training vectors within a threshold distance of each of the challenge vectors in the vector space. Determining the neighborhood density for each of the challenge queries in the vector space may include finding an average distance to N nearest training vectors in the vector space.

In general, an aspect disclosed herein is a method for objective characterization of machine-learning models, including receiving first training data formatted to be used in the training of a machine-learning model; receiving one or more challenge queries formatted to be run on the machine-learning model; generating, for the first training data, a plurality of associated training vectors that embed at least some of the first training data into a vector space; generating, for each of the one or more challenge queries, a plurality of associated challenge vectors that embed at least some of the challenge queries into the vector space; and determining, for each challenge query, a corresponding quality metric for the machine-learning model by determining a neighborhood density for each of the challenge queries in the vector space.

Examples may include one or more of the following features. The method may include, responsive to determining, for each challenge query, a corresponding quality metric for the machine-learning model, creating the machine-learning model may include training the machine-learning model using the first training data. The method may include, responsive to determining, for each challenge query, a corresponding quality metric for the machine-learning model, retraining the machine-learning model using second training data that may include at least some of the first training data and at least some of the challenge queries. The method may include, responsive to determining, for each challenge query, a corresponding quality metric for the machine-learning model, selecting the machine-learning model for use in processing at least one of the challenge queries. The method may include, responsive to determining, for each challenge query, a corresponding quality metric for the machine-learning model, selecting the machine-learning model for use in processing other queries similar to at least one of the challenge queries.

Testing a large language model using an approximate kernel density estimate (KDE) algorithm increases the testing speed, and thus reduces the time used, to estimate a quality metric for the testing machine learning model.

Using nearest neighbors to approximate kernel density allows the techniques described herein to be manageable for modern LLM datasets involving billions of text samples. The techniques reduce the complexity from extremely large numbers, e.g., quintillions, of calculations to significantly lower numbers, e.g., tens of thousands, with a low loss of fidelity.

The details of one or more embodiments are set forth in the accompanying drawings and the description below. Other features and advantages will be apparent from the description and drawings, and from the claims.

DESCRIPTION OF DRAWINGS

FIGS. 10A-C show illustrations showing the prompt used to instruct an LLM used as a paraphrasing engine.

FIG. 16 shows four line charts comparing KDE components and neighbor distances to perplexity.

FIG. 17 shows four line charts comparing KDE components and neighbor distances to perplexity.

In the figures, like references indicate like elements.

DETAILED DESCRIPTION

Figure 1:
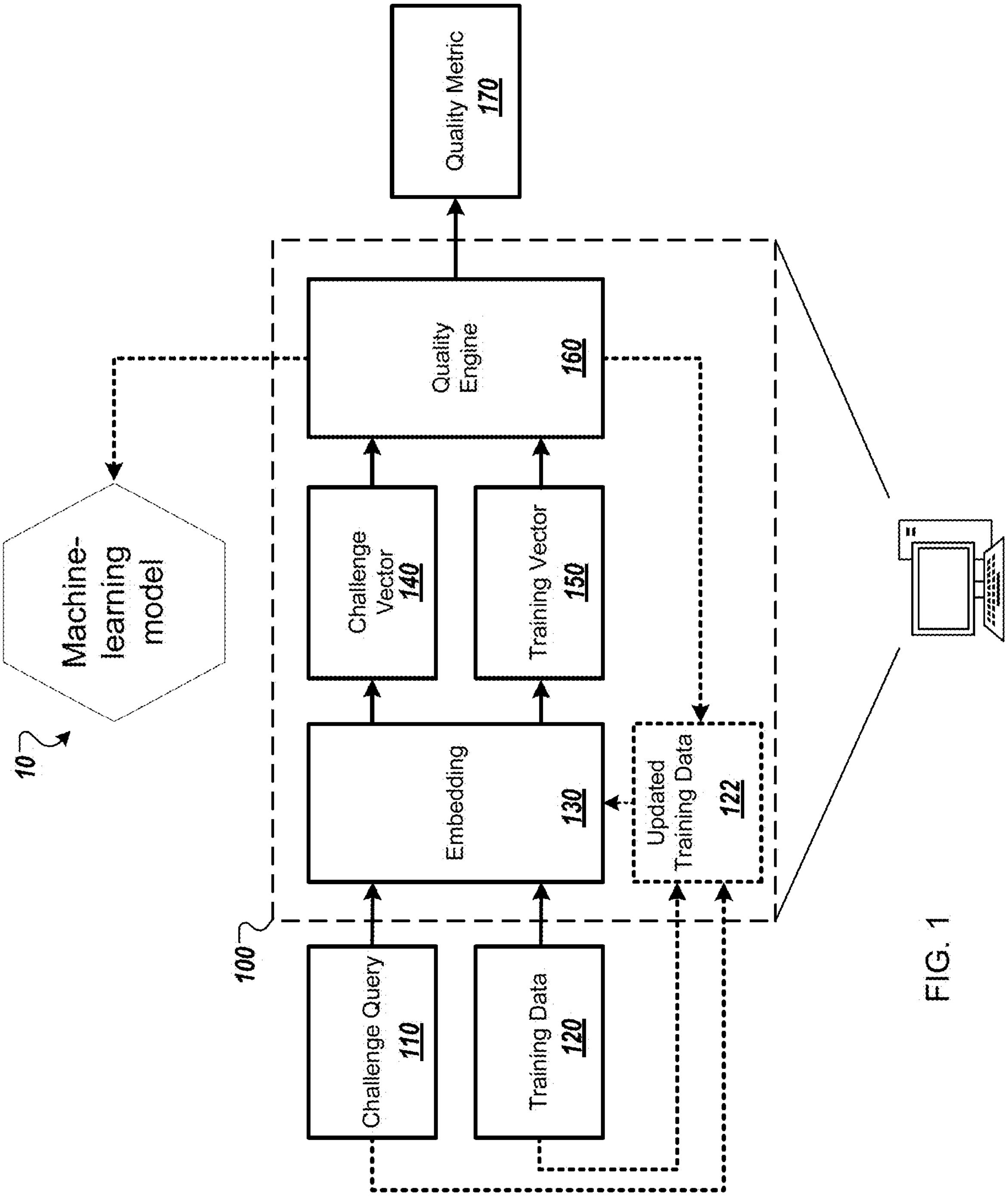
FIG. 1 is a schematic illustration of a system for characterizing test time behavior of machine-learning models.

In general, a concept of machine-learning models can be that the predictions of large language models (LLMs) depend on the characteristics of the data distribution to which they are fit. The amount of relevant support in a training distribution may indicate whether or not the model is likely to make accurate predictions on a given sample. A reason LLMs can produce correct responses to test questions can be that they have already seen something nearly identical in their training data. However, this idea can be difficult to test without evidence. A solution to this problem is determining a density estimation to test the predictions of LLMs.

Historically, the performances of trained language models can be measured and compared using an approximation of their ability to model sequence likelihoods. However, it may be possible to directly estimate how dense the training data distribution is at that point in sequence space to explain a significant amount of the variance in the language modeling ability of an LLM.

A Kernel Density Estimation (KDE) can be used to estimate the density of an LLM high dimensional training data distribution. A kernel function can be used to compute the similarity of any two points in a sample space, and any finite set of samples from a distribution. KDE is a process to estimate the relative density at arbitrary points in the sample space.

A language model can be trained on a set of instructional examples having elevated density of the training distribution in some locations through the inclusion of small groups of paraphrased test questions. A properly configured KDE is elevated at the points where paraphrases were added relative to other points. The elevated performance on the test questions caused by the leakage is predictable with statistical significance using only the density estimate value for the question texts.

Disclosed herein are systems and methods for measuring a relevant training sample density for specific challenge queries based on kernel density estimation (KDE). KDE values are used to predict performance of a machine-learning model based on the challenge queries or indicate whether the challenge queries are sufficiently different from the training data for a particular machine-learning model such that the model less is effective, e.g., out-of-distribution. The KDE values are a relative measure between queries. A higher KDE value for one query than a second indicates that the training data is more representative of the first query than the second.

One example of characterizing a machine-learning model includes determining an accuracy and/or performance of the machine-learning model based on challenge queries designed to test whether the training data used by the machine-learning model is sufficiently dense to provide accurate results relevant to each challenge query. Each challenge query in a set can be correlated with an estimate of how many relevant test samples within the training data were seen for each query.

The characterization system described herein is based on determining a kernel density estimate (KDE) for each query of a set of multiple challenge queries. A KDE neighborhood density value is generated for each challenge query to determine whether the individual queries are within a sufficient number of training vectors in an embedding vector space. The system can determine for each query whether the neighborhood density value meets a threshold. A neighborhood density value above the threshold indicates that there are sufficient training samples within the training data for a machine-learning model to accurately predict an outcome for the respective query. If the training data does not meet the neighborhood density threshold for a set of challenge queries, the training data can be supplemented with some or all of the challenge queries, e.g., some of the challenge queries may be "leaked" to the training data.

A system 100 for objectively characterizing a machine-learning model 10 by determining an associated quality metric is shown in FIG. 1. The system 100 characterizes the machine-learning model 10 according to a quality engine 160, which determines a neighborhood density value for a set of challenge queries 110 based on training data 120 from the machine-learning model 10. If the density of the training data 120 for a given set of challenge queries 110 is above a quality threshold, the system 100 may perform additional functions.

The additional functions can include error analysis, including instance level, or group-wise, to determine if meaningful groups exist within the training data. The additional functions can include interventional guidance, filling distributional gaps, or pruning oversaturated areas. The additional functions can include scalable embedding-based methods (e.g., LMD3) help quantify whether overlap is significant enough to counter a claim that a given performance result is "generalization" or leakage of the queries into the training data.

In one example, the system 100 processes the training data 120 to implement a new machine-learning model 10. In another example, the system 100 uses the training data 120 to train or retrain an existing machine-learning model 10. In another example, the system 100 uses the training data 120 to select the machine-learning model 10 for use in processing the challenge queries 110, or other queries similar to the challenge queries 110.

If the density of the training data 120 is below the threshold, the system 100 may determine that the training data 120 is insufficient. In such cases, the system 100 may supplement the training data 120 with some or all of the challenge queries 110 before training, retraining, or selecting.

Referring to FIG. 1, the system 100 receives a set of training data 120 that is formatted to be run in the machine-learning model 10. Said another way, the training data 120 may be processed by machine-learning model 10 to generate output. In some examples, the training data 120 is the training data that was used to train the machine-learning model 10.

To be processed by the machine-learning model 10, the training data 120 has the same data format as formats processed by the machine-learning model 10. For example, the machine-learning model 10 may receive data of various formats to generate output of the same format. The machine-learning model 10 may receive data formats such as natural language strings, image data, or video data.

The system 100 receives one or more challenge queries 110 formatted to be run in the machine-learning model 10, e.g., the same format of the training data 120, or the same format that the machine-learning model 10 is programmed to receive. The challenge queries 110 are a set of test queries for which the machine-learning model 10 can generate output when processing the queries 110. In the example of an LLM, each query may be a text string that the LLM generates predictive text as output responsive to the query.

The system 100 uses an embedding engine 130 to generate challenge vectors 140 and training vectors 150 in a vector space. The embedding engine 130 uses an embedding function to embed the challenge queries 110 and the training data 120. Embedding functions are used to reduce the dimensionality of the challenge queries 110 and training data 120 into a lower-dimensional transformed vector space. An example of the embedding function includes a neural embedding function.

The embedding engine 130 embeds each query of the challenge queries 110 into an associated challenge vector to generate the challenge vectors 140. In an example, the embedding model is transformer-based sequence embedding model, e.g., from a sentence-transformers library. For each resulting challenge vector, a density estimate is computed. The density estimates produced can be used to infer the model's ability to answer a question-like query or model the tokens of a general text query based on whether the relative density is higher or lower at that point in sample space. The embedding engine 130 uses the embedding function to embed the training data 120 into the vector space to generate associated training vectors 150.

The training data 120 may be prohibitively large to embed the entirety of the training data 120, e.g., computationally expensive, and/or time consuming. The embedding engine 130 can embed some, or all, of the challenge queries 110 and the training data 120. The embedding engine 130 can embed a statistically representative subsample of the training data 120 into the vector space, thus reducing the computational cost of embedding all of the training data 120. Agreement between the approximation under the subsample and the true value increases for larger subsets.

The system 100 provides the embedded challenge vectors 140 and the embedded training vectors 150 to a quality engine 160 to determine one or more quality metrics 170. The quality engine 160 uses a KDE model to determine a neighborhood density value as the quality metric 170 for each query embedded in the challenge vectors 140.

An example of the KDE model is an approximate KDE model which computes an unbiased estimator of an exact KDE model. Using the approximate KDE model enables the scaling of a KDE model to large datasets, $X_c$, by decomposing the full KDE into the contributions of close neighbors and the rest of the challenge vectors 140.

Without wishing to be bound by theory, for a training dataset, $X_c=\{x_0, x_1, \ldots x_{n-1}\} \in R_d$ with a bandwidth parameter h>0 and a kernel function $K_h$: $R^d \times R^d \rightarrow R$, for a challenge vector $x_q$ the exact KDE at $x_q$ over $X_c$ denoted $KDE_{X_c}(x_q)$ is given as:

$$KDE_{X_c}(x_q) = \frac{1}{|X_c|} \sum_{x \in Xc} K_h(x, x_q)$$

An unbiased estimator of $KDE_{X_c}(x^q)$ can be computed by splitting $X_c$ of size n into two non-overlapping subsets, $X_A$ and $X_B$, computing $z_A=KDE_{X_A}(x_q)$ and $z_B=KDE_{X_B}(x_q)$ independently, and then combining them in a weighted sum according to the sizes of $X_A$ and $X_B$:

$$z_q = \frac{|XA|}{n} z_A + \frac{|Xb|}{n} z_B$$

Therefore, an approximate $KDE_{X_c}(x_q)$ can be determined by Density Estimation from Approximate Nearest Neighbors (DEANN, Karppa et al. (2022)), where the contribution of the nearest neighbors ($X_A$) and the contribution of the rest of the data ($X_B$) are computed.

In some examples, the approximate KDE can be determined using the following Algorithm 1:

---

Input: A corpus $X_c$ of n text embeddings $x_c \in R_d$, a k nearest neighbor search subroutine over vectors in Xc, $NN_k(\cdot)$, a kernel function K and bandwidth parameter h together with the corpus over which it is computed X, defining a KDEX(·), two random sample size parameters m1 and m2 (m2 < m1 « n), a dataset of query embeddings $X_q$, $x_q \in R_d$.

Output: $Zq, \in R_{>0}^{|X_c|}$ an approximation of the *KDE* for each $x_q \in X_q$.

Randomly sample without replacement $X_1$ of size m1 from $X_c$
for all $x_q \in X_q$ do
  $X_{nn} \leftarrow NN_k(x_q) \in R^{k \times d}$
  $X_1' = \{x \in X_1 | x \notin X_{nn}\}$
  Randomly sample without replacement $X_2$ of size m2 from $X_1'$.
  $Z_{nn} \leftarrow KDE_{x_{nn}}(x_q)$ -continued $Z_{rand} \leftarrow \mathrm{KDE}_{x_2}(x_q)$ $$z \leftarrow \left(\frac{k}{n}\right) z_{nn} + \left(\frac{n-k}{n}\right) z_{rand}$$

end for

{Note $Z_{nn}$ and $Z_{rand}$ can be returned individually to analyze the effect of local and global contributions independently.}

Briefly and without expressing limitation, for each embedded query in the challenge vectors 140, the KDE model calculates a distance in the vector space between the embedded query and one or more embedded samples in the training vectors 150. For example, the vector space distance is zero if the quality engine 160 determines that an embedded query exists exactly in the training vectors 150.

The quality engine 160 determines the neighborhood density value for an embedded query by counting a number of the training vectors 150 that are within a threshold distance of the query. The threshold distance is a predetermined distance value between an embedded query and the training vectors 150. The quality engine 160 can determine the neighborhood density value for some, or all, embedded queries of the challenge vectors 140.

One example of determining the neighborhood density value for each of the challenge queries 110 embedded in the challenge vectors 140 includes finding an average distance to a number, N, of nearest training vectors 150. Finding an average distance to a fixed number, N, of the training vector 150 can reduce the overall time of computing the neighborhood density value for each of the challenge queries 110.

In a non-limiting example, a relatively high number of training vectors 150 being within the threshold distance of an embedded query is indicative of a high neighborhood density value. A relatively low number of training vectors 150 being within the threshold distance an embedded query is indicative of a low neighborhood density value.

The system 100 stores a neighborhood density threshold for comparison to the neighborhood density value. Based on whether the neighborhood density value, e.g., quality metric 170, meets or exceeds neighborhood density threshold for a sufficient number of queries in the challenge vectors 140, the system 100 may perform additional functions on the training data 120, the machine-learning model 10, or both.

If the system 100 determines that the training data 120 meets the neighborhood density threshold, the system 100 determines that the training data 120 may be used to train or re-train the machine-learning model 10. If the machine-learning model 10 is not trained, the system 100 determines to train the machine-learning model 10 using the training data 120. In another example, the system 100 creates a trained machine-learning model 10 by using the training data 120 to train an untrained machine-learning model 10.

If the system 100 determines that the training data 120 does not meet the neighborhood density threshold, the system 100 can modify the training data 120 to attempt to create updated training data that meets the neighborhood density threshold. The system 100 can use a portion, e.g., at least some, of the challenge queries 110 with the training data 120 to create the updated training data. The system 100 can merge the portion of the challenge queries 110 with the training data 120 to create the updated training data. In some examples, the system 100 merges a portion of the challenge queries 110 which had a neighborhood density value that did not meet the than the neighborhood density threshold.

The system 100 can then provide the updated set of training data and the challenge queries 110 to the embedding engine 130, embed the updated set and the challenge queries 110, and provide the embedded updated set and embedded challenge vectors 140 to the quality engine 160 to determine a new quality metric for the updated training data. This process can be repeated until the updated training data meets the quality metric.

As described herein, the system 100 can be used to characterize a generalized machine-learning model 10. The machine-learning model 10 may be a trained, or an untrained model. The machine-learning model 10 has a network of interconnected nodes in a series of layers. For example, the machine-learning model 10 can have an input layer, one or more hidden layers, and an output layer. Each connection between nodes is represented by a statistical weight. A trained model may have connections between nodes represented by pre-determined weights, while an untrained model may include random, or pseudo-random, weights.

One example of the machine-learning model 10 is an LLM. An LLM is an artificial neural network machine-learning model which can be used for general-purpose language generation. An LLM is trained to learn statistical relationships from input training data, e.g., text, e.g., training data 120, during a training process which can be self-supervised or semi-supervised. The training data 120 can include a large number of test samples on which the LLM is trained. The trained LLM generates output based on one or more received queries and the learned statistical relationships related to the queries.

Figure 2:
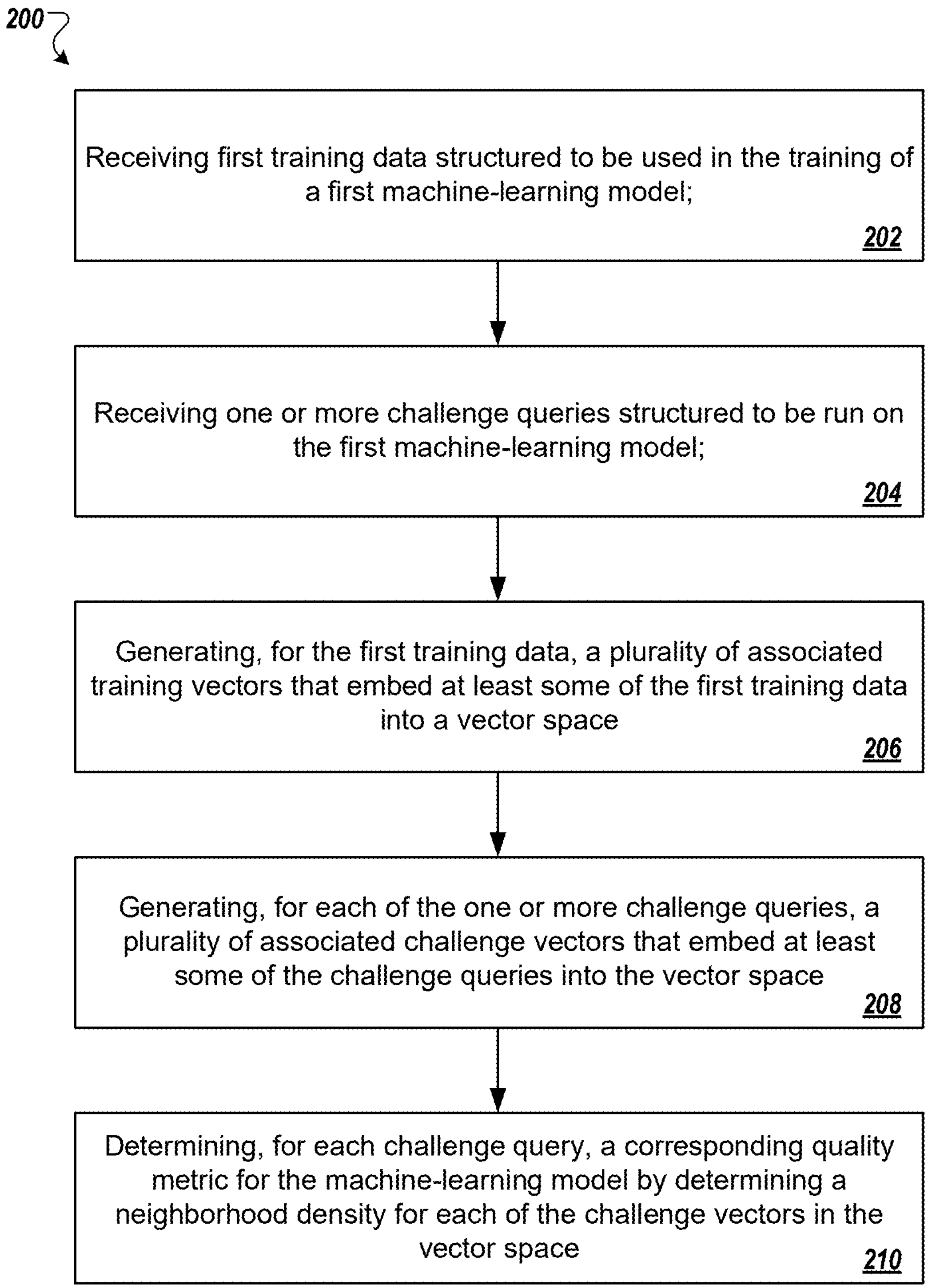
FIG. 2 is a flow chart diagram of a method for characterizing test time behavior of machine-learning models.

FIG. 2 is a flow chart diagram showing a method 200 for characterization of machine-learning models. The methods described herein can be performed by the system 100 to characterize a machine-learning model such as machine-learning model 10, or training data such as training data 120.

Training data formatted to be used in the training of a machine-learning model is received (step 202). The training data has a format that is processed by the machine-learning model, which can include text, video, or images.

One or more challenge queries formatted to be run on the machine-learning model are received (step 204). The challenge queries have a format that is processed by the machine-learning model, as described herein.

Training vectors that embed at least some of the training data into a vector space are generated for the training data (step 206). The training vectors are generated from the training data using an embedding function. Embedding the training data reduces the dimensionality of the data into a lower dimensional vector space.

Challenge vectors that embed at least some of the challenge queries into the vector space are generated for each of the one or more challenge queries (step 208). The challenge vectors are generated from challenge queries using the embedding function.

A corresponding quality metric for the machine-learning model is determined for each challenge query (step 210). A KDE model determines a neighborhood density value as the quality metric. The system determines a neighborhood density value for each of the embedded queries in the challenge vector.

Optionally, the method 200 can include one or more of the following examples after the corresponding quality metric is determined for each challenge query. One example includes creating the machine-learning model and training the machine-learning model. The machine-learning model is created and/or trained using the first training data after the corresponding quality metric is determined.

One example includes retraining the machine-learning model using a second set of training data that includes at least some of the first training data and at least some of the challenge queries. At least some of the challenge queries can be "leaked" into the training data. The updated training data including the leaked queries can be processed by the system to determine a new quality metric for the updated training data. The updated training data can be used to train, or retrain, a machine-learning model.

One example includes selecting the machine-learning model for use in processing at least one of the challenge queries. The system can select a machine-learning model which processes input of the same format as the challenge queries and the training data. The system can select a machine-learning model trained by training data having sufficient neighborhood density values based on the challenge queries.

Figure 3:
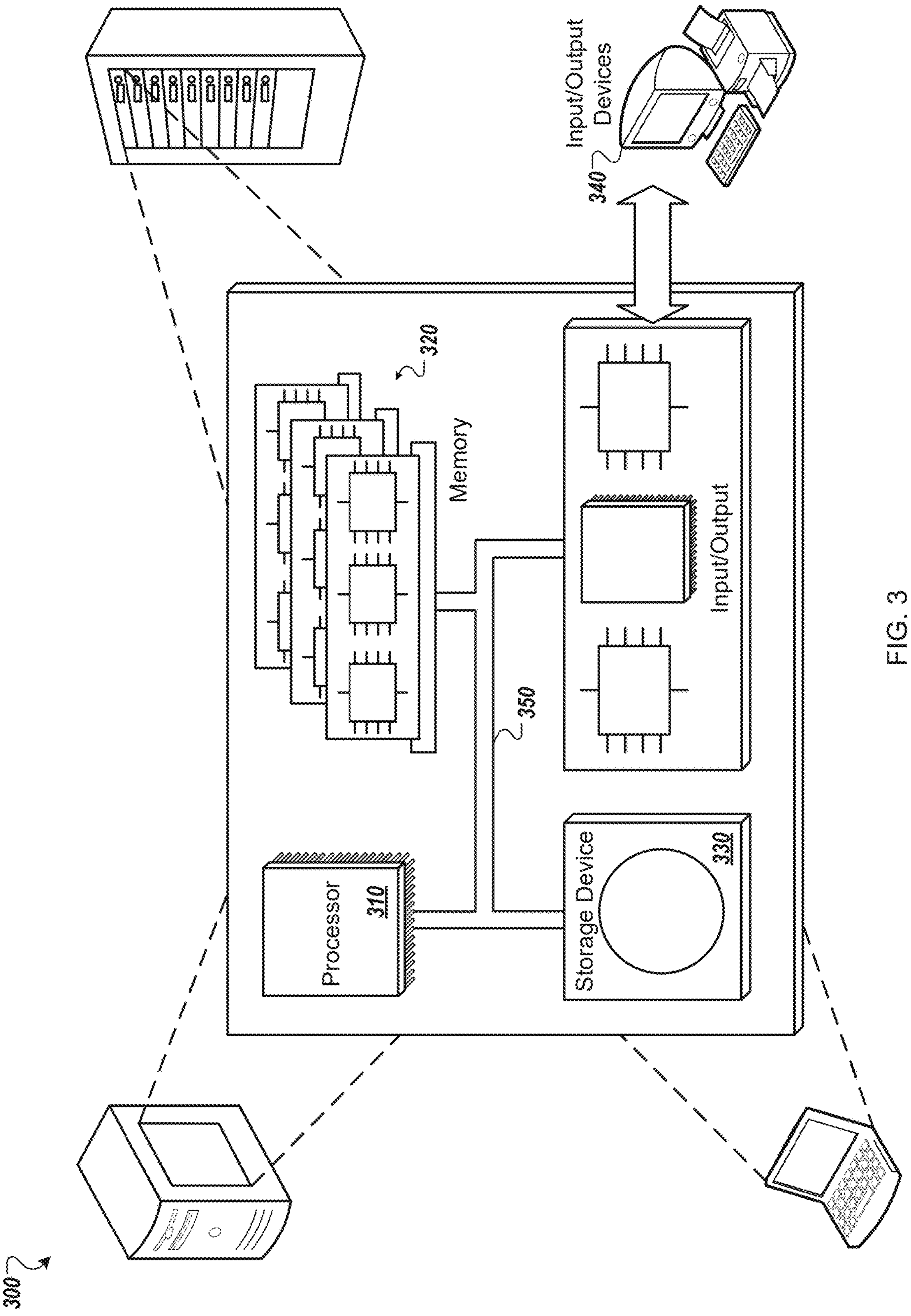
FIG. 3 is a schematic illustration of an example computer system that can provide the system of FIG. 1.

The system 100 is run on a computing system. FIG. 3 is a block diagram of an example computer system 300 that can provide the system 100 of FIG. 1. The system 300 includes a processor 310, a memory 320, a storage device 330, and one or more input/output interface devices 340. Each of the components 310, 320, 330, and 340 can be interconnected, for example, using a system bus 350.

The processor 310 is capable of processing instructions for execution within the system 300. The term "execution" as used here refers to a technique in which program code causes a processor to carry out one or more processor instructions. The processor 310 is capable of processing instructions stored in the memory 320 or on the storage device 330. The processor 310 may execute operations such as characterizing the machine-learning models described herein.

The memory 320 stores information within the system 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the system 300. In some implementations, the storage device 330 is a non-transitory computer-readable medium. In various different implementations, the storage device 330 can include, for example, a hard disk device, an optical disk device, a solid-state drive, or some other large capacity storage device. In some implementations, the storage device 330 may be a cloud storage device, e.g., a logical storage device including one or more physical storage devices distributed on a network and accessed using a network.

The input/output interface devices 340 provide input/output operations for the system 300. In some implementations, the input/output interface devices 340 can include one or more of a network interface device, e.g., an Ethernet interface. In some implementations, the input/output device can include driver devices configured to receive input data and send output data to other input/output devices, e.g., keyboard, printer and display devices 360. In some implementations, mobile computing devices, mobile communication devices, and other devices can be used.

Referring to FIG. 1, the embedding engine 130 and/or the quality engine 160 can be realized by instructions that upon execution cause one or more processing devices to carry out the processes and functions described above, for example, characterizing machine-learning models. Such instructions can include, for example, interpreted instructions such as script instructions, or executable code, or other instructions stored in a computer readable medium.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

EXAMPLES

Example 1

Models and Data

In an example, a transformer-based sequence embedding model from a sentence-transformers library was used to generate the feature space in which density estimates were computed. A base Llama 2 model was trained on doctored versions of the training set for the MMLU benchmark for 2 epochs for the controlled finetuning experiments. This regime produced differences between example settings while still being realistic. The performance of models in the Pythia suite were analyzed as a function of a version of their training corpus, The Deduplicated Pile, for the pretraining experiments.

Paraphrasing Process

A synthetic experimental setting in which the specific amount of support for test queries present in the training data was tuned was designed in order to develop the density methodology. Briefly and without expressing limitation, a paraphrase of a test example is the transform $P: x \rightarrow x'$ such that the semantics of x and x' are equivalent. Access to such a transformation function allowed controlled experiments to be performed where a test sample x was taken and intervened to increase the amount of specifically relevant training data for sample x by mixing paraphrases x' into the training data. Modern capable LLMs can be treated as a useful approximation of such a transform.

Experiment 1: Leakage to Increase Density, Finetuning-Scale

A number, e.g., 1,000, of random questions were taken from the MMLU test set (e.g., of 14,042 questions) as test questions and paraphrased the random questions 3 times. A copy of the selected test questions as a "paraphrase" having distance 0, e.g., "perfect" similarity, to the original query was also considered. Each test question was paraphrased and the cosine similarity to the original query based on their embeddings was computed for each sample in the set of 3 paraphrases. The paraphrases for each query sorted in ascending order by similarity to the original query were defined as para1, para2 and para3 respectively, the set {para1, para2} is then referred to as para12, and the set {para1, para2, para3} is then referred to as para123.

The base language model was finetuned on datasets constructed by taking the "auxiliary train" split of the MMLU dataset and mixing in combinations of the paraphrases, an exact copy of the original query, or both (e.g., the presence of, or lack thereof, was denoted using exact1 and exact0 respectively). The performance of the models trained on these different datasets was evaluated and the impact that the inclusion of paraphrases and exact copies of test queries has on the trained models were analyzed.

Experiment 2: Hold-Out to Decrease Density, Finetuning-Scale

A second collection of experiments were focused on controlling the level of training support for specific queries. The subject metadata provided for the questions in the MMLU testing set were used to intervene by "leaving-one-out" of the subject areas covered in the training data. The supercategories defined by the MMLU authors, which maps each of the 57 fine-grained subject areas to a more general topic were considered. In examples in which the training data does not have subject metadata associated with it, the subject metadata can be generated using the following procedure.

Each one of the training samples was assigned to fine-grained subject area using a kNN classifier. Each point receives a label according to a majority vote between the subject labels of the k-nearest questions in the test set according to distances in embedding space. After each training question was assigned a subject, the training question was assigned to a supercategory based on the aforementioned mapping. Since this may not yield a balanced subsetting of the training samples (e.g., some supercategories may be larger than others), the counts for each supercategory were examined and 4 with counts between 2,000 to 4,000 questions were selected (out of 99, 842 total).

The base language model was trained on a collection of datasets where, for each split, the group of training examples corresponding to each of the 4 supercategories selected in turn was left out. For each model, the impact that the intervention has on the average performance across test questions sharing the supercategory label of the left out samples, as well as the test questions from the other 3 supercategories as reference was measured. This is presented as a delta against the control model trained on the full collection of training samples.

In-the-Wild: In and Out-of-Distribution Queries, Pretraining-Scale

A comparison of the test time behavior of a language model to its pretraining data is described below. In addition to the increased scale with which the technique was applied, the increased generality of the pretraining distribution required curated sets of queries to represent different test time scenarios. Two classes of query sets were considered: in-distribution (ID) and out-of-distribution (OD). For ID query sets, a definition of any query $x_q$ taken directly from the training corpus $X_c$ was chosen. Anything else was considered to be OD.

MMLU Test (OD): The test questions in the paraphrasing experiments were used as a set of factual questions across a variety of domains. Perplexities on both the query texts as well as PPL (e.g., perplexity) on the correct target response conditioned on the query text were computed since there were ground truth responses for the queries.

OpenOrca Random 10 k (OD): A random selection of 10,000 questions from the OpenOrca curation project's flagship dataset were used as a set of diverse sequences outside of the training distribution. Perplexities on both the query and responses for these samples were computed.

Random 10 k segments (ID): 10,000 segments from the training corpus itself were randomly sampled without replacement. These were drawn from the same set of segments over which neighbor retrieval and KDE computation were performed. Since these were webtext segments, there is no notion of "response" so the PPL of the text segment under the LLM were computed.

Results

Due to the generality of the analysis methodology, in order to de-risk the main experiments, a series of "sanity checks" regarding the embedding model used for the paraphrasing experiments were performed. The bandwidth hyperparameter of the KDE, was used as a basic check to calibrate expectations about how much a model should overfit when trained on leaks of test questions. Bandwidths of {0.01, 0.05, 0.1, 1.0} for the exponential kernel, and {0.1, 0.2, 0.5, 1.0} for the gaussian kernel were used. These were identified as reasonably similar sets for both kernel functions that cover most of the expressive range of the kernel density measure.

Experiment: "Expected" Dependence Between Performance and Density

Figure 4:
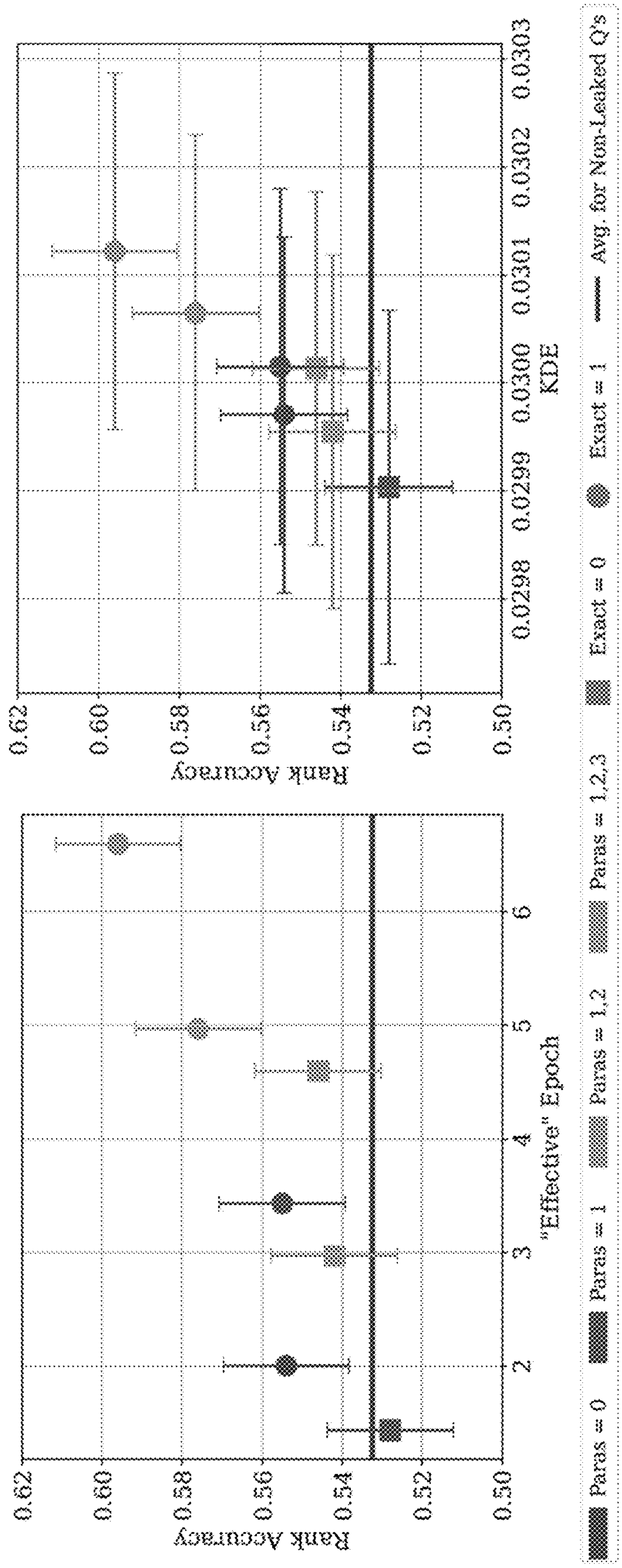
FIG. 4 shows two charts comparing rank accuracy to the "Effective Epoch" and KDE values.

FIG. 4 shows that training on the various leaky dataset formulations improves performance. FIG. 4 visualizes the performance improvements as a trend across experiments. FIG. 4 is two charts comparing the Rank Accuracy to the "Effective Epoch" for leaked- and non-leaked questions. Briefly and without expressing limitation, rank accuracy is a means of evaluating LLM models, e.g., the MMLU dataset. "Rank Accuracy" denotes the scoring method used by the HuggingFace Open LLM Leaderboard for evaluating the MMLU dataset (Brown et al. (2020)).

To enable the aggregate interpretation of the paraphrasing experiments, the rank accuracy as a function of "effective" epochs was plotted. Effective epoch is a way of correcting for the training set for each experiment having a different size, since different numbers of paraphrases are added. The "effective" epoch is a way to normalize over the differently-sized datasets. The number of epochs trained on a given test question $x_t$, with a set of paraphrases and exact duplicates $X_p$ included in the training set, was computed by the expression $\Sigma_{x_p \in X_p} \text{cossim}(x_t, x_p)$. Since an exact copy has similarity ~1.0 and paraphrases have scores<1.0, this expression produces sensible x-axis values differentiating each experiment, e.g. for the Para=0, Exact=1 case, when training for 2 epochs, the exact question copies represent 2*1.0=2 effective epochs, and then paraphrases count for an additional partial epoch (2*cossim($x_t$, $x_p$)) each depending on their similarity to the original question. In FIG. 4, both a positive trend in performance as a function of effective epochs as well as a positive trend as a function of our KDE measure is shown—the latter of which is computed without access to either ground truths or any outputs of the LLM being analyzed.

Figure 5A:
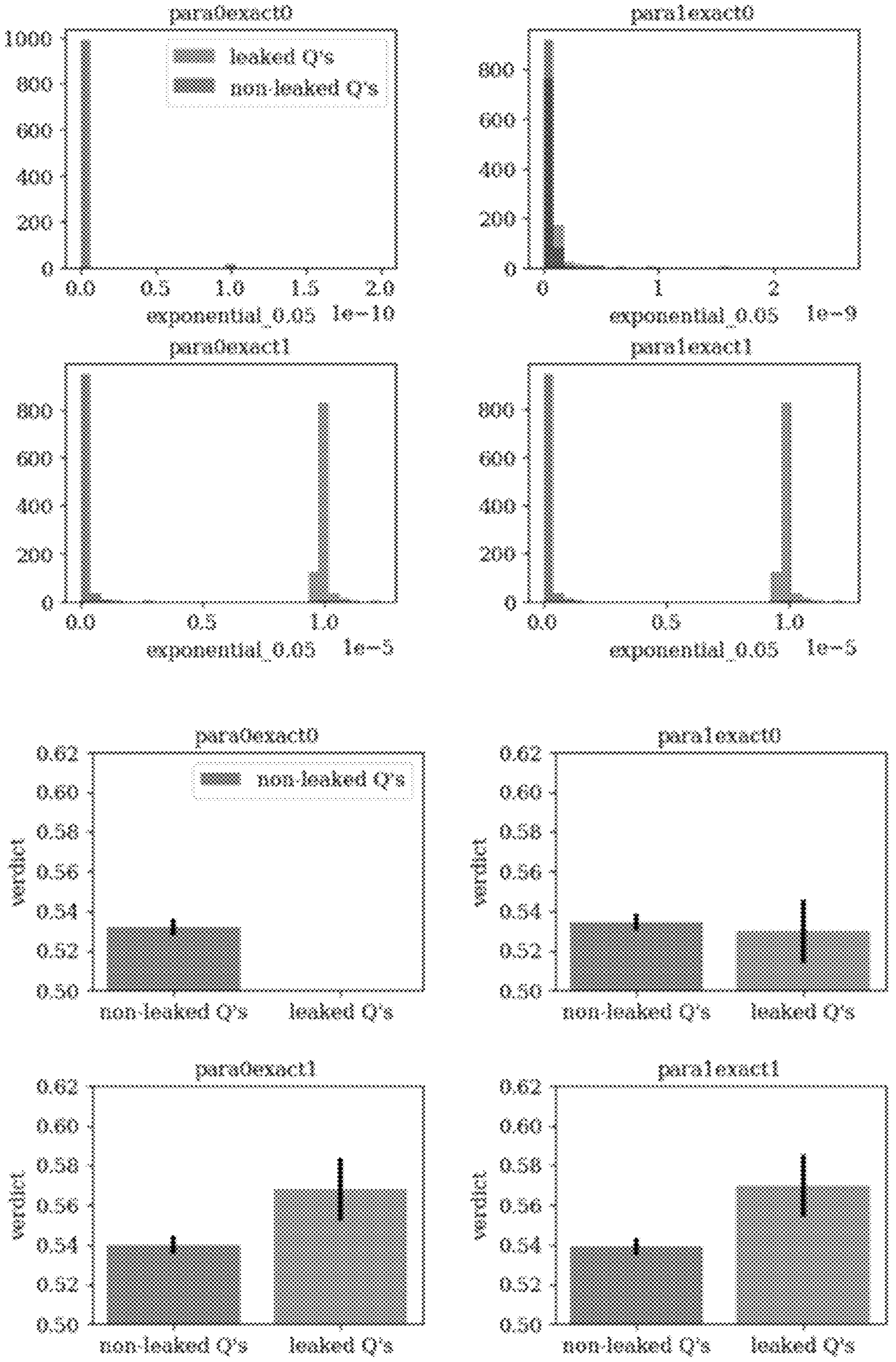
FIG. 5A shows eight bar charts comparing count and KDE values, and rank accuracy for leaked- and non-leaked questions for combinations of paraphrased and exact queries.
Figure 5B:
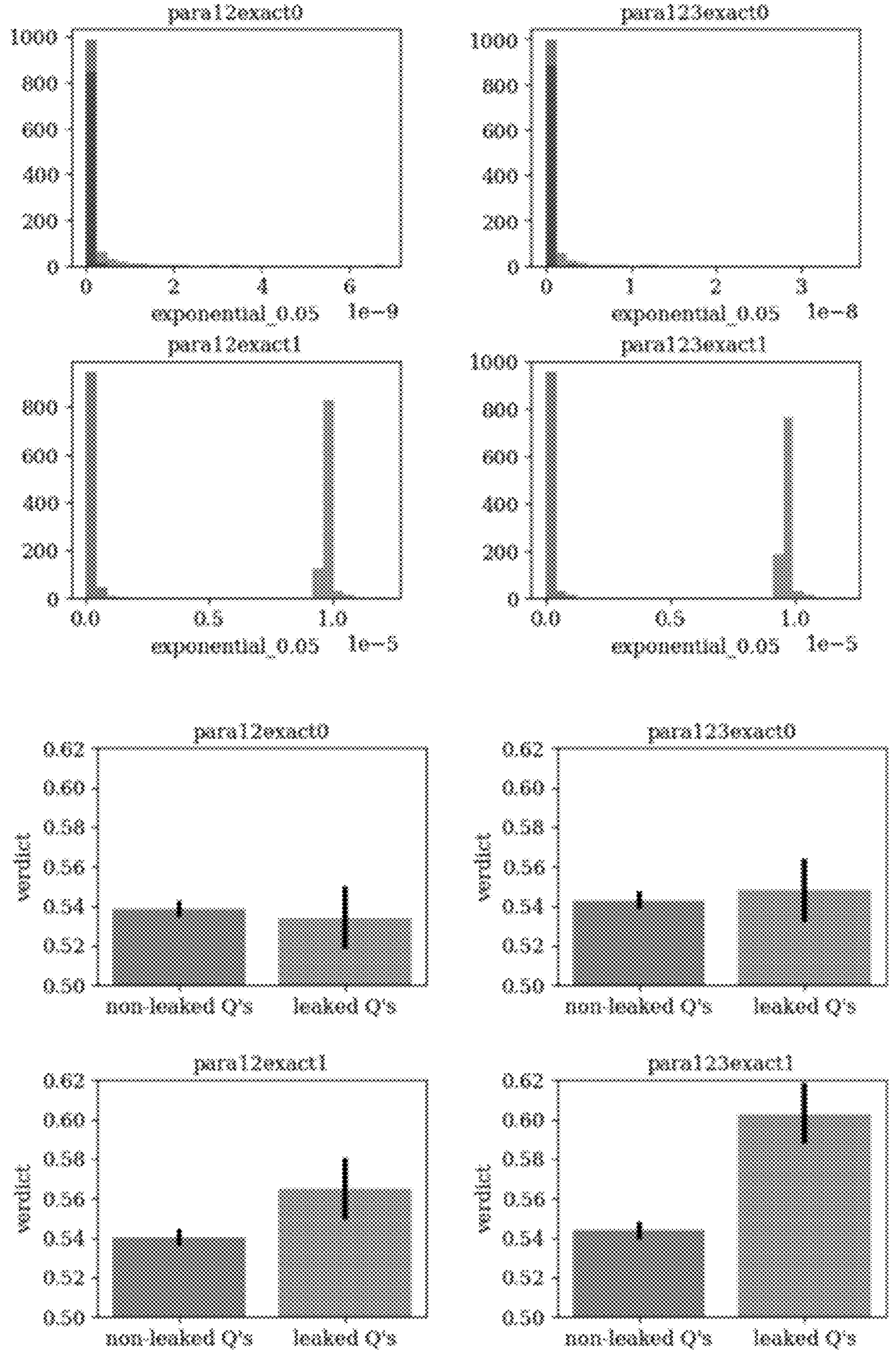
FIG. 5B shows eight bar charts comparing count and KDE values, and rank accuracy for leaked- and non-leaked questions for combinations of paraphrased and exact queries.

In FIGS. 5A and 5B, each experiment was individually examined, showing that the KDE is a discriminative feature between the leak set and non-leak set. The upper four bar charts in FIGS. 5A and 5B show experiments where no exact copies of test questions were included, only paraphrases. The bottom four bar charts in FIGS. 5A and 5B show experiments where 1 exact copy of test questions were included, in addition to paraphrases.

FIGS. 5A and 5B show that the KDE is a discriminative feature between the leak set and non-leak set. To measure the reliability of the correspondence between data density and performance, mixed-effects regressions were performed. In summary, the leakage conditions reliably increase accuracy (Exact leak: p<0.001, Paraphrased leaks: p<0.001) and decrease perplexity (Exact leak: p<0.001, Paraphrased leaks: p<0.001) on the test questions. Critically, training data density estimates also reliably predict variance in accuracy and perplexity whereas density increases, accuracy increases (p<0.001) and perplexity decreases (p<0.001).

From left to right, FIGS. 5A and 5B collectively show the effect of an increase in the number of paraphrases of each test question that were leaked into the training data. Experiments in the lower two rows include an exact copy of each leaked test question, while experiments in the upper two rows do not. For the "Count" histograms, the distributions of KDE values (gaussian kernel and bandwidth 0.1) were plotted for the test queries that were leaked, exactly or via paraphrase, and not leaked, for each leakage intervention experiment. In the accuracy bar charts, the corresponding accuracy breakdown for the leaked and non-leaked sets for each experiment is shown.

Overall, increasing support for test questions via incorporating paraphrases into the training data increases performance on those test questions, and the increase may be larger with the addition of exact leaks of test questions. The addition of the exact copy of each question may make the leaked and non-leaked question sets highly separable under our KDE measure as demonstrated by the distinct concentration of "leaked Q" KDE values away from 0.0 in the lower two rows.

In-the-Wild Experiments: Aggregation-Specific Dependence Relationship.

Figure 14:
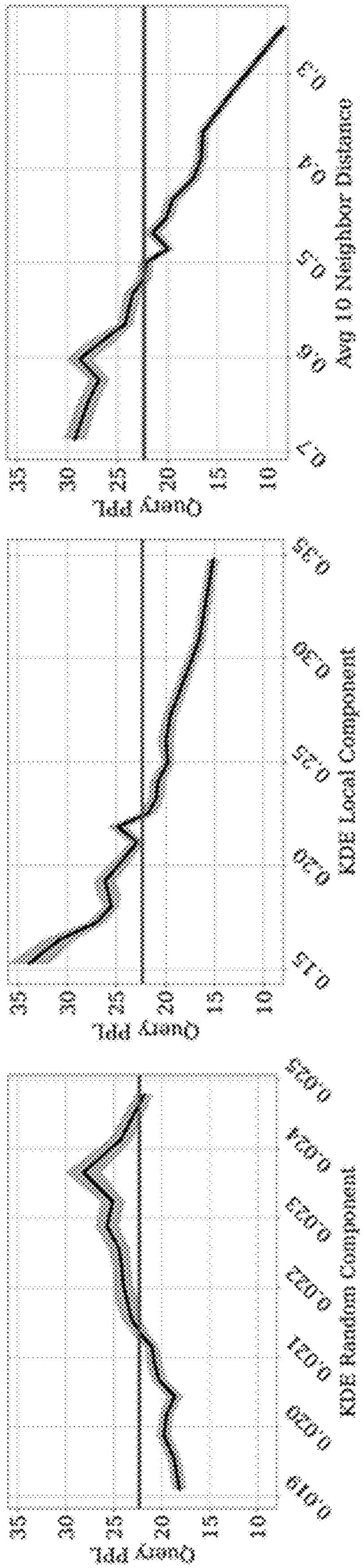
FIG. 14 shows three line charts comparing query perplexity to KDE components and neighbor distances.

Considering a set of random samples from The Deduplicated Pile, ID with respect to the model's training data, in FIG. 14, perplexity as a function of KDE is plotted by binning the data by KDE values (x-axis) and computing the average accuracy (y-axis) within each bin. The chart on the left shows that, when measuring the KDE with respect to only the random samples selected in our approximation algorithm, a noisy, slightly positive trend is shown. When considering the KDE computed only with respect to the top k neighbors to model perplexity on said query.

Figure 15:
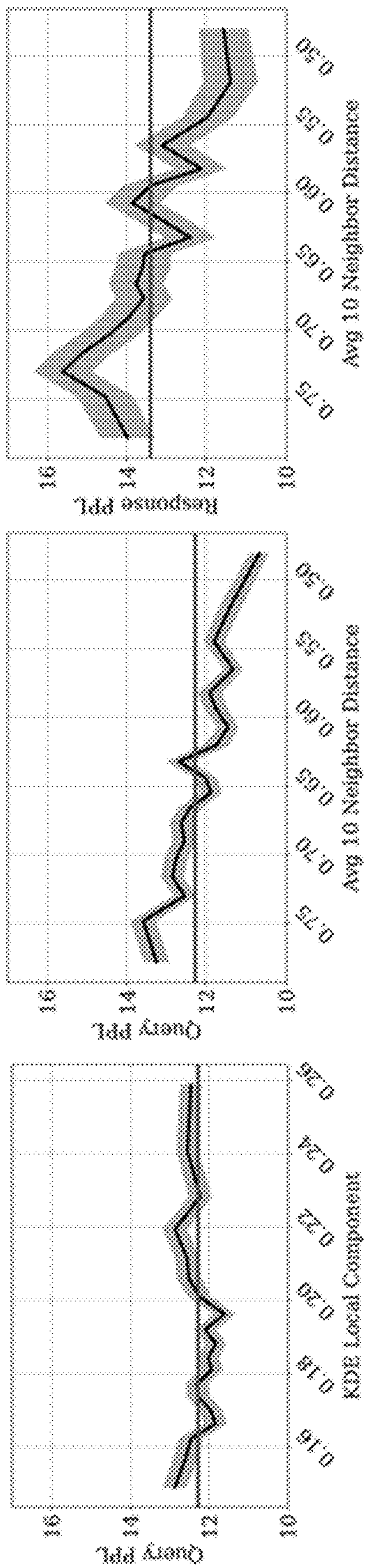
FIG. 15 shows three line charts comparing query perplexity and response perplexity to KDE components and neighbor distances.

Next, switching to a set of out of domain (OoD) queries, the MMLU test set, the left chart of FIG. 15 shows that the PPL on the query/question texts is not strongly correlated with the local KDE component, but the middle chart shows that it is correlated with the average distance to the top k neighbors in the corpus. In some examples, OoD can be taken to mean the query is one the model had not seen before. In one sense, OD can mean that the query is not identical to any training data. In a more general sense, OoD can mean that the query is about a subject or relies on knowledge that the model hasn't encountered before. Further, it is shown that the perplexity of the correct response is also correlated with distance to the top k neighbors. (Note that x-axes are reversed in the distance charts to make the trend visually congruent with the handedness of the trends for density measurements FIG. 14 and FIG. 15.)

As with the finetuning scale experiments, mixed-effects regression was used to measure the reliability of the effect of density on perplexity and report those full results in Example 2—Appendix. Query perplexity decreased as data density increased for the randomly-sampled ID query set (p<0.001) and the OoD OpenOrca dataset (p<0.001) but not the OoD MMLU Test query set (p=0.95). Response perplexity decreased slightly with increased density for the MMLU Test set (p<0.001).

As text length may directly affect perplexity values, for FIG. 14 and FIG. 15, a subset of the queries was isolated where lengths were relatively similar to reduce the variance due to length before plotting. A small number of extremely large outlier perplexity values were observed, and those rows dropped. Details about this process are provided in Example 2-Appendix.

Insights and Applications

Insights from both groups of experiments can be summarized by stating that, in extremal cases like test question leakage, one can expect a relationship between model performance and apparent training data density in query space. However, at pretraining scale, the specific way in which one aggregates information about relevant support in the dataset matters. Using the abstraction of "effective epochs" one can understand how repeated training on subsets of the data can lead to elevated marginal performance on those subsets. However, the number of effective epochs used to achieve inflated test accuracies on benchmarks, such as those reported in Yang et al. (2023), might be higher than one would expect. Therefore, any un-evidenced claim that contamination may be a reason to discount the benchmark results for models trained on unspecified data distributions (at least at the common 7B parameter scale) should be considered.

Overall, training data density quantification can be a grounded methodology for analyzing the failure modes of language models at an instance and group-wise level, since it builds evidence for expected relative performance based directly on aspects of the training data itself. In response to observing relatively high density in certain regions of test query space and lower density in others, it can be expected that the consistency of model performance may be improved by supplementing data in those regions of weaker support through human data curation as well as automated processes such as machine paraphrasing.

Conclusion

The focus on a small set of specific, but very relevant, datasets and models for the field and the fact that the KDE based methodology proposed may not be considered hyperparameter free, e.g., a user may choose the kernel parameters. It may also likely that the preprocessing parameters, e.g., length and stride, used to segment the training data before embedding may influence the outcome of the analysis. This work was performed at a finer segmentation granularity than other work and the choices were not ablated sufficiently to support that this is helpful to explain meaningful amounts of variance. Full access to the training dataset of a newly "released" model is increasingly rare. However, given the potential of data-centric analysis techniques, it may be considered that this may be a shortcoming of contemporary norms within the field rather than a true limitation of the methodology.

Example 2—Appendix

A.1 Models and Data

A.1.1 SentenceTransformers

For all the finetuning scale experiments involving the MMLU dataset, the multi-qa-MiniLM-L6-cos-v1 model from the sentence-transformers library (Reimers & Gurevych, 2019) following the setup of Yang et al. (2023) was used. This model was selected based on precedent as well as general placement on the sentence-transformers retrieval model leaderboard. For the pretraining data embeddings, a general purpose variant of the same architecture was used, all-MiniLM-L6-v2, a similar size model trained on a more general data distribution.

A.1.2. LLAMA 2

An open source large language model, Llama 2, (Touvron et al., 2023), was used in the base form as the starting checkpoint for the finetuning scale experiments. A full finetuning of all parameters used the axolotl4 (github.com/OpenAccess-AI-Collective/axolotl) finetuning harness with the following features: DeepSpeed ZeRO-2, "target only loss" calculation, sample-packing, warm-up with a linear learning rate schedule, and weight decay. The precise parameters for the different experiments are detailed herein in Example 2—Appendix, as well as the training configuration files provided with the source code release.

Embeddings were computed based on the last layer hidden states of the Llama 2 model after training on the finetuning data. The features were pooled and normalized in the same manner as the last layer hidden states of the sentence-transformers embedding models.

A.1.3. MMLU

The MMLU (Hendrycks et al., 2021b; a) dataset was used as the testbed for the density estimation methodology. This dataset was used because it was used in both the Hugging Face Open LLM Leaderboard task set, as well as other works (Team et al., 2023) in language model training. In order to limit confounding factors, the base model was trained on a data distribution similar to that of the test task: the "Auxiliary" training set for MMLU. The training samples were formatted using the same logic as the EleutherAI LM Evaluation Harness (Gao et al., 2021) implementations. The precise MMLU test set was used as filtered and prepared by the harness as this was a slight subset of the original test set released by Hendrycks et al. (2021b).

A. 1.4. Pythia

The Pythia suite (Biderman et al., 2023) is an open science focused language model collection with public code and data. The Pythia suite is a modern causal language model which can be considered a similar option to the Llama 2 which was amenable to the analysis at the time of this study.

A.1.5. The (Deduplicated) Pile

The Pile (Gao et al., 2020) is a public multi-domain web corpus for language model pretraining. The reworked version was used that was globally deduplicated (Biderman et al., 2022) before the corresponding set of Pythia models were trained on it. The raw dataset contains approximately 134 M documents of varying lengths. Due to the input length limitations of embedding models, and to increase meaningful distances between relatively short queries and individual samples in the corpus, the dataset was re-segmented by splitting the documents into chunks of 50 whitespace separated tokens (split on " ") with a stride of 40 tokens, creating an overlap of 10 tokens each with preceding and succeeding segments. The result was an inflation of the original 134 M documents into ~3.5 B segments.

This choice for segment length based was made on the observation that 50 whitespace separated tokens is approximately the length of a few sentences or a short paragraph in English. The stride was chosen to limit false negatives during nearest neighbor search without causing the segment count to grow beyond what the implementation can handle. A stride greater than or equal to a segment size results in no overlap between corpus segments, or worse, omitted sequences which can incur "false negatives" during neighbor search even for queries with large overlaps with training data.

A.2.6 Approximate KDE Parameters

For each approximated KDE computation in the experiments with The Deduplicated Pile, for each query, the exact 1,000 nearest neighbors were used, and a random complement of 10,000, drawn for each query from a fixed presample of 1,000,000 sequences from the training corpus. These correspond to k, m2 and m1 respectively in Algorithm 1.

A. 1.6. On The Definition of Xc

While the text documents that comprise a training corpus (which was embedded to produce Xc) were taken as an input to the analysis, $D_c$ is broken up into the set of text segments $D_c=\{s0, s1, \ldots sn-1\}$ both during the training of a LLM and during the density analysis. The embedding models used to transform $s_i$ into $x_i$ may have a maximum input length which can be accepted.

The kernel function that a KDE is based on may rely on the ability to compute meaningful distances between points in the embedding space. Choosing the segment size for partitioning the documents in $D_c$ defines the sample space over which densities were computed and, in some examples, the outcome of the analysis.

For the finetuning experiments, segmenting was not performed as the queries were already relatively short. For the pretraining corpus analyzed, the effect segmenting may have on the results is discussed herein.

A. 1.7 "in Distribution" Queries

When analyzing queries that were suspected or known to be "In Distribution" (ID), i.e., contained in the training data, it can be considered to embed all samples into the space in which the KDE is performed under the similar conditions (e.g., "same conditions"). This means that if $x \in X_q$ and $x \in X_c$ then the embedding vector of the query may be equal to the embedding of the matching doc in corpus, up to some floating point error tolerance. If any segmentation and/or prompt templating is used, it may be applied in a similar manner (e.g., the same manner) between the train corpus and test query set if any of the queries were intended to be matches with elements in the corpus with a distance ~0.0 between their embeddings. For the leakage experiments and for the ID pretraining experiments, this requirement was considered met.

A.2. Paraphrase Process Details

An LLM, GPT4-turbo, was prompted to behave as a general purpose paraphrasing model using a template designed to elicit paraphrased samples that were thoroughly transformed with respect to the original queries. This is similar to Yang et al. (2023) and other work that utilize paraphrasing as a black-box transformation in the security and safety domain (Kirchenbauer et al., 2023; Krishna et al., 2023). FIG. 10A shows the prompt used to paraphrase the test queries. FIG. 10B shows an example of an original MMLU test question. FIG. 10C shows the paraphrase of the original test question. FIGS. 10A-10C are illustrations showing the prompt used to instruct the LLM used as a paraphrasing engine for the MMLU experiments adopted from Yang et al. (2023). GPT-4 Turbo, gpt-4-1106-preview version, was able to reliably paraphrase MMLU questions without losing significant context. The question preamble as well as all answer choices were part of the paraphrasing step.

A spectrum of paraphrases was collected with varying degrees of similarity and dissimilarity to test queries. k paraphrases were sampled for every test query on which was intervened. Pairing the prompt with the gpt-4-1106-preview model yielded diverse paraphrases that similar to the key details of the original question.

A.3 Regression Analyses: Mixed Effects Modeling

Measuring the effect of training data density at the example level is shown herein. Example training data density was treated as a fixed effect and other covariates (e.g., such as the subject area of an MMLU question) as random effects (e.g., noise which can be removed). Without wishing to be bound by theory, mixed effects modeling can work by marginalizing the covariates and fitting a model to predict the dependent variable from the fixed effect(s). The model may yield an estimated coefficient for each fixed effect and p-values that, used in conjunction with an α-criterion, may determine the statistical significance of the effect. The fixed effect predicted the variance of the dependent variable when the p-value is below the α-criterion, e.g., $\alpha=0.05$.

If p was determined to be p=001, it may be expected to mistakenly conclude there was an effect one time in 1000 hypothetical experiments. Importantly, the sign of an estimated coefficient may indicate the direction of the relationship. A fixed effect (e.g., density) would have a statistically-reliable positive correlation with a dependent variable (e.g., accuracy) if $p<0.5$ and $\hat{B}>0$. Overall, agreement between the observed trends in binned plots of performance marginalized over various ranges of density estimates within a test set, the significance of the fixed effect, and the sign of its regression coefficient were investigated.

All analyses were performed using R Statistical Software (v4.3.3, R Core Team, 2021) and supporting packages Ime4 v1.1-35.2 (Bates et al., 2015) and ImerTest v3.1-3 (Kuznetsova et al., 2017).

A.4 Controlled Experiments: Leakage Full Regression Results

Two classes of analysis for the controlled experiments are presented: manipulation verification regressions and the critical experimental regressions evaluating the effect of training data density. Regressions targeting the DV of rank accuracy were generalized linear mixed models (GLMER) fit by maximum likelihood with the Laplace approximation. Regressions targeting the DV of perplexity were linear mixed models (LMER) fit with restricted maximum likelihood (REML) and Satterwaite's method for calculating p-values was used. The mixed effects structure across all regressions was substantially the same: query length and example nested in MMLU question domain were treated as random intercepts.

A.4.1 Leak Manipulation Verification.

Predicting Rank Accuracy with Leak Condition (GLMER)

$$\text{rank accuracy} \sim \text{exact leak} + \text{paraphrase leaks} + (1 \mid \text{len}(dq)) + (1 \mid \text{task}(dq)/\text{example})$$

Due to the natural ordering of paraphrase exposure (0,1, 2,3), the paraphrase variable was treated as an ordered categorical and the relationship as linear, quadratic, and cubic was tested.

| | Estimate | Std. Error | z value | p-value |
|---|---|---|---|---|
| (Intercept) | 1.30910 | 0.35018 | 3.738 | <.001 |
| exact_leak | 0.62556 | 0.07626 | 8.203 | <.001 |
| paraphrase_leaks (Linear) | 0.44949 | 0.07448 | 6.035 | <.001 |
| paraphrase_leaks (Quadratic) | 0.08411 | 0.07471 | 1.126 | 0.26 |
| paraphrase_leaks (Cubic) | −0.08231 | 0.07569 | −1.087 | 0.27 |

Predicting Perplexity with Leak Condition (LMER)

$$\text{perplexity} \sim \text{exact leak} + \text{paraphrase leaks} + (1 \mid \text{len}(dq)) + (1 \mid \text{task}(dq)/\text{example})$$

| | Estimate | Std. Error | t value | p-value |
|---|---|---|---|---|
| (Intercept) | 1.803 | 3.199e−02 | 56.361 | <.001 |
| exact_leak | −1.642e−01 | 9.318e−03 | −17.620 | <.001 |
| paraphrase_leaks (Linear) | −1.094e−01 | 9.254e−03 | −11.827 | <.001 |
| paraphrase_leaks (Quadratic) | 4.924e−02 | 9.318e−03 | 5.284 | <.001 |
| paraphrase_leaks (Cubic) | −1.513e−02 | 9.381e−03 | −1.613 | 0.107 |

A.4.2 Training Data Density Effect Evaluation.

Predicting Rank Accuracy with Training Data Density (GLMER)

$$\text{rank accuracy} \sim KDEK,\ h = 0.1 + (1 \mid \text{len}(dq)) + (1 \mid \text{task}(dq)/\text{example})$$

| | Estimate | Std. Error | z value | p-value |
|---|---|---|---|---|
| (Intercept) | 1.086 | 3.437e−01 | 3.159 | 0.00158 |
| gaussian_0.1 | 5.678e+04 | 3.514 | 16159.318 | <.001 |

Predicting Perplexity with Training Data Density (LMER)

$$\text{perplexity} \sim KDEK,\ h = 0.1 + (1 \mid \text{len}(dq)) + (1 \mid \text{task}(dq)/\text{example})$$

| | Estimate | Std. Error | t value | p-value |
|---|---|---|---|---|
| (Intercept) | 1.90 | 3.129e−02 | 60.70 | <.001 |
| gaussian_0.1 | −2.158e+04 | 9.025e+02 | −23.91 | <.001 |

A.5 Controlled Experiments: Leave-One-Subject-Out

In a second experiment set focused on controlling the level of training support for specific queries, the subject metadata provided for the questions in the MMLU testing set was utilized to intervene by "leaving-one-out" of the subject areas covered in the training data. In particular, the supercategories defined by the MMLU authors, which maps each of the 57 fine-grained subject areas to a more general topic, were considered. The training data may not have subject metadata associated with it and so an automated procedure was used to generate such.

Each one of the training samples from the MMLU "auxiliary" training set was assigned to fine-grained subject area using a kNN classifier, where each point received a label according to a majority vote between the subject labels of the k-nearest questions in the test set according to distances in embedding space. After assigning each training question a subject, the training question was assigned to a supercategory based on the aforementioned mapping. Since this may not yield a balanced subsetting of the training samples (some supercategories were much larger than others), the counts for each supercategory were examined and four with counts between 2,000 to 4,000 questions (out of 99,842 total) were selected.

Figure 6:
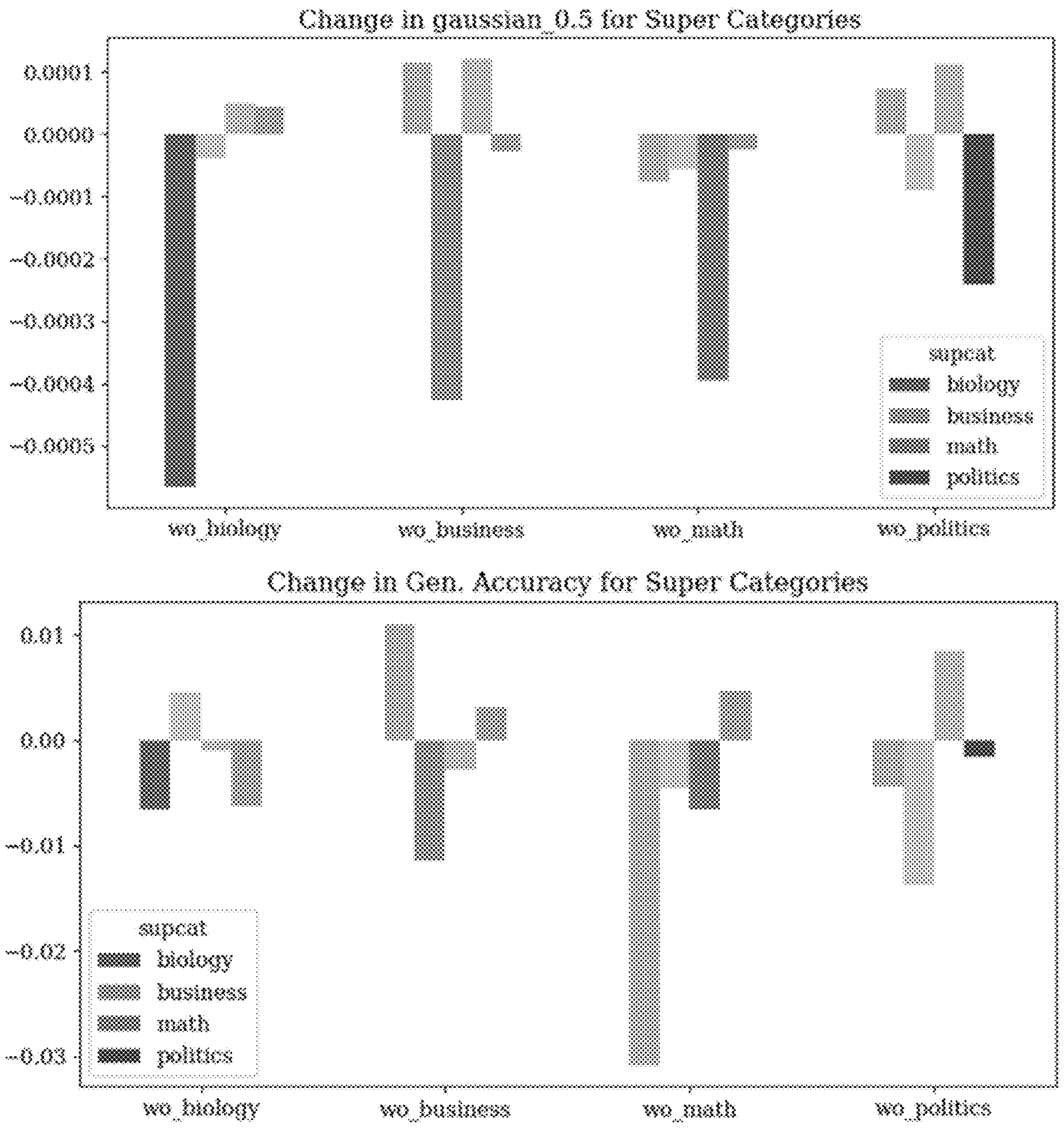
FIG. 6 shows a bar chart showing change in gaussian values for super categories.
Figure 7:
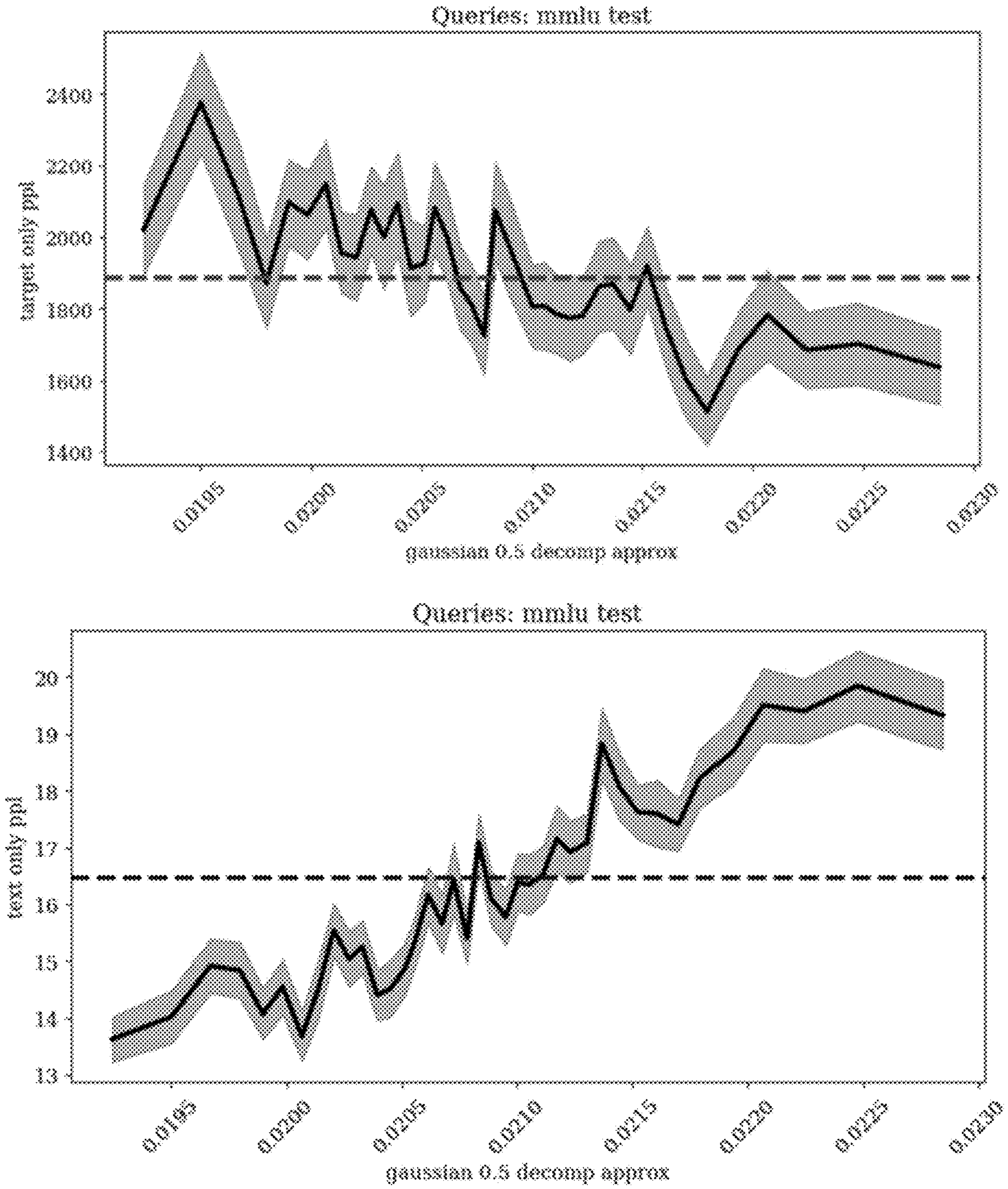
FIG. 7 shows a bar chart showing change generative accuracy values for super categories.

The base language model was selected and trained using a collection of datasets where, for each split, the group of training examples corresponding to each of the four supercategories were left out and selected in turn. For each model, the impact that the intervention has on the average performance across test questions was measured sharing the supercategory label of the left out samples, as well as the test questions from the other three supercategories as reference. The results of these experiments are presented in FIG. 6 and FIG. 7 as deltas in density and performance against the control model, which was trained on the full collection of training samples.

A.6. In-the-Wild: Controlling for Length

The Deduplicated Pile was segmented according to whitespace before embedding, and there was an amount of variation in the lengths of the texts after tokenization, as measured by character length. Without expressing limitation, perplexity may decrease as a function of length under a language model as tokens may be easier to predict given more context, a control for length to highlight any observable differences according to density was performed. Outliers with respect to the performance measurement were dropped (e.g., rows where query PPL>500 and Response PPL>60 were dropped) as these may skew the marginalization process. To clean up the data for FIG. 14 and FIG. 15, perplexity as a function of query length in characters was analyzed, and used to identify a suitable upper and lower bound for length such that any variance that can be explained by changes in density rather than length was shown.

A.7 In-the-Wild Experiments: Full Regression Results Predicting Perplexity with KDE Computed with Respect to the Deduplicated Pile for Pythia-6.9 B (GLMER)

$$DV \sim KDEK, h = 0.5 + (1 \mid \mathrm{len}(dq)$$

The "local" density estimate for regressions including density as a fixed effect was used and reported as (^$\hat{P}$/p-value). "ns" denotes no significant effect.

| Query Set | $KDE_{g,\,0.5}$ | Avg 10 NN |
|---|---|---|
| | DV = Query Perplexity | |
| Rand. 10k (ID) | $\hat{\beta} = -62.250$, $p < .001$ | $\hat{\beta} = 49.388$, $p < .001$ |
| MMLU Test (OoD) | ns | $\hat{\beta} = 8.5067$, $p < .001$ |
| Open Orca (OoD) | $\hat{\beta} = -6.9712$, $p < .001$ | $\hat{\beta} = 1.5845$, $p = .001$ |
| | DV = Response Perplexity | |
| Rand. 10k (ID | N/A | N/A |
| MMLU Test (OoD) | $\hat{\beta} = -53.911$, $p = .001$ | $\hat{\beta} = 16.737$, $p = .002$ |
| Open Orca (OoD) | ns | nsl |

A.8. Preliminary Investigations

A.8.1. Paraphrase Retrieval

The LMD3 hypothesis relied on the fact that mixing copies of samples x, or paraphrases thereof, into the training corpus X should increase the KDE at query point x. A condition for this to be true is that the paraphrases mixed into the pretraining dataset may be represented by the embedding model as more similar on average to corresponding original queries than the nearest neighbors of other training samples were on average. In order to confirm that the lightweight embedding model used was adequate for the similarity computations required by the KDE, and thereby limit the likelihood that the neighbor-search step may confound the overall results, a retrieval problem was formulated using the queries and associated paraphrases and confirmed that the nearest neighbor search reliably retrieves the "correct" neighbors for each query. In addition to that test, the distribution was visualized of the nearest neighbor distances for the 1,000 queries where three paraphrases and one exact copy were planted, for those queries that were not.

Figure 11:
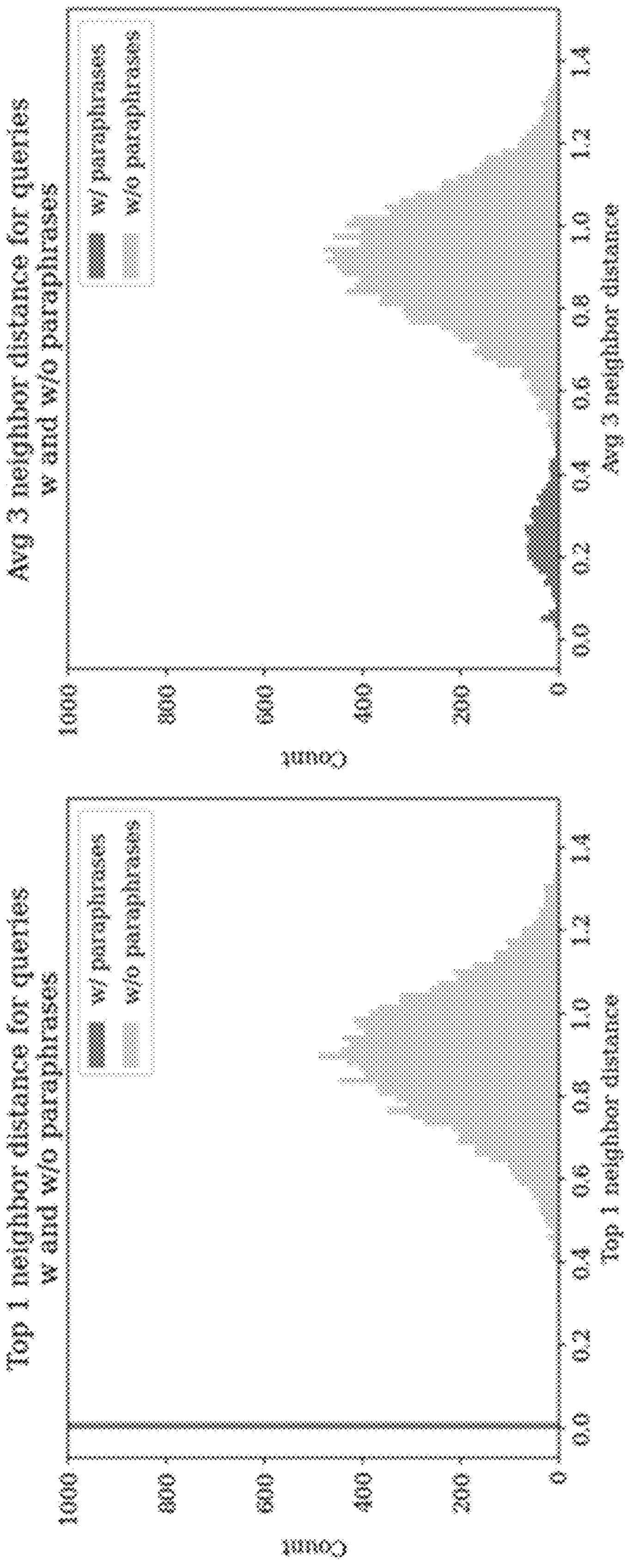
FIG. 11 shows two histogram charts showing counts against neighbor distances for two queries with and without paraphrases.

FIG. 11 is two bar charts showing counts against neighbor distances for two queries with and without paraphrases. It is shown that due to the presence of the exact copy of each query for the interventional subset, for queries with leakage, the nearest neighbor is at distance 0.0 in the left panel of FIG. 11. The average distance to the top-3 nearest neighbors is smaller than for queries with no paraphrases or copies due to the presence of the paraphrases, as shown in the right panel of FIG. 11. This visualization was corroborated by treating the collection of copies and paraphrases for each question as the target set in a retrieval problem and measuring Recall@k for $k \in 10, 4$. While a score of 1.0 may be achievable at k=4 for this data, the model does not achieve this score. At k=10, the score was over 92% which may be treated as sufficient evidence that the local neighborhoods of queries may contain the paraphrases and copies introduced with some reliability. It was concluded that the embedding space generated by our retrieval embedding model is unlikely to cause experiments to return null effect relationships with the KDE for the simple reason that the embedding space does not return the "correct" neighbors.

A.8.2. Bandwidths for Separability of Leak and Non-Leak.

Figure 12:
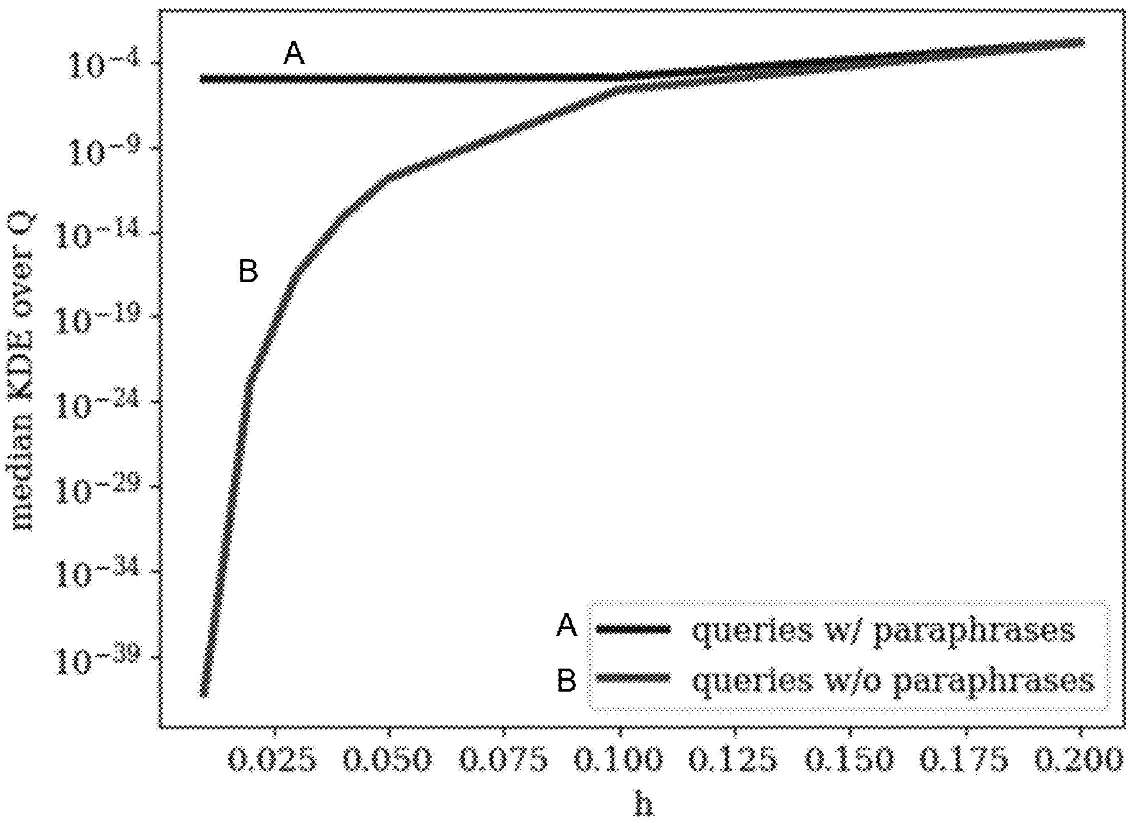
FIG. 12 shows a line chart comparting the median KDE over Q against bandwidth (h) for queries with paraphrases, and without.

Since the KDE bandwidth for a particular problem can be an empirically derived parameter, a small ablation was performed to choose a selection of bandwidths that were likely to produce an informative range of KDE values. Especially those bandwidths for identifying the set of queries for which were intervened through the planting of paraphrases amongst other test questions. In FIG. 12, as bandwidth (h) was swept from low to higher values (e.g., from 0.025 to 0.2), the difference between the KDEs for queries with planted paraphrases (line A) and those without (line B) was reduced. In one example, Q refers to the set of queries. The chart plots the median KDE over the set of queries, Q.

FIG. 12 is a line chart comparing the median KDE over Q against bandwidth (h) for queries with paraphrases, and without. Narrow bandwidths, e.g., close to 0.0, less than 0.075, less than 0.1, or less than 0.05, may be more useful for developing a reliable estimator of whether a query has relevant paraphrases included in the training dataset. A representative selection of bandwidths from across this range was used in the main experiments to examine what effect the bandwidth has on the relationship between KDE and other measurements. For two kernels, e.g., Euclidean kernels, that were investigated, the bandwidth selections were {0.01, 0.05, 0.1, 1.0} for the exponential kernel, and {0.1, 0.2, 0.5, 1.0} for the gaussian kernel. It was determined that these were reasonably similar sets for both kernel functions.

A.8.3. Training to High Accuracy on the Test Set.

To ground expectations on what performance was expected given the realistic finetuning hyperparameters utilized, a check was performed on the experiment by training for an extended number of epochs on a dataset that included, e.g., solely included, the MMLU test queries. An extremely large number of epochs of were used to approach 100% accuracy in answering the questions, e.g., nearing 'perfect', performance on the test in a training scenario on the test queries. This is similar to the observations of Yang et al.

Figure 13:
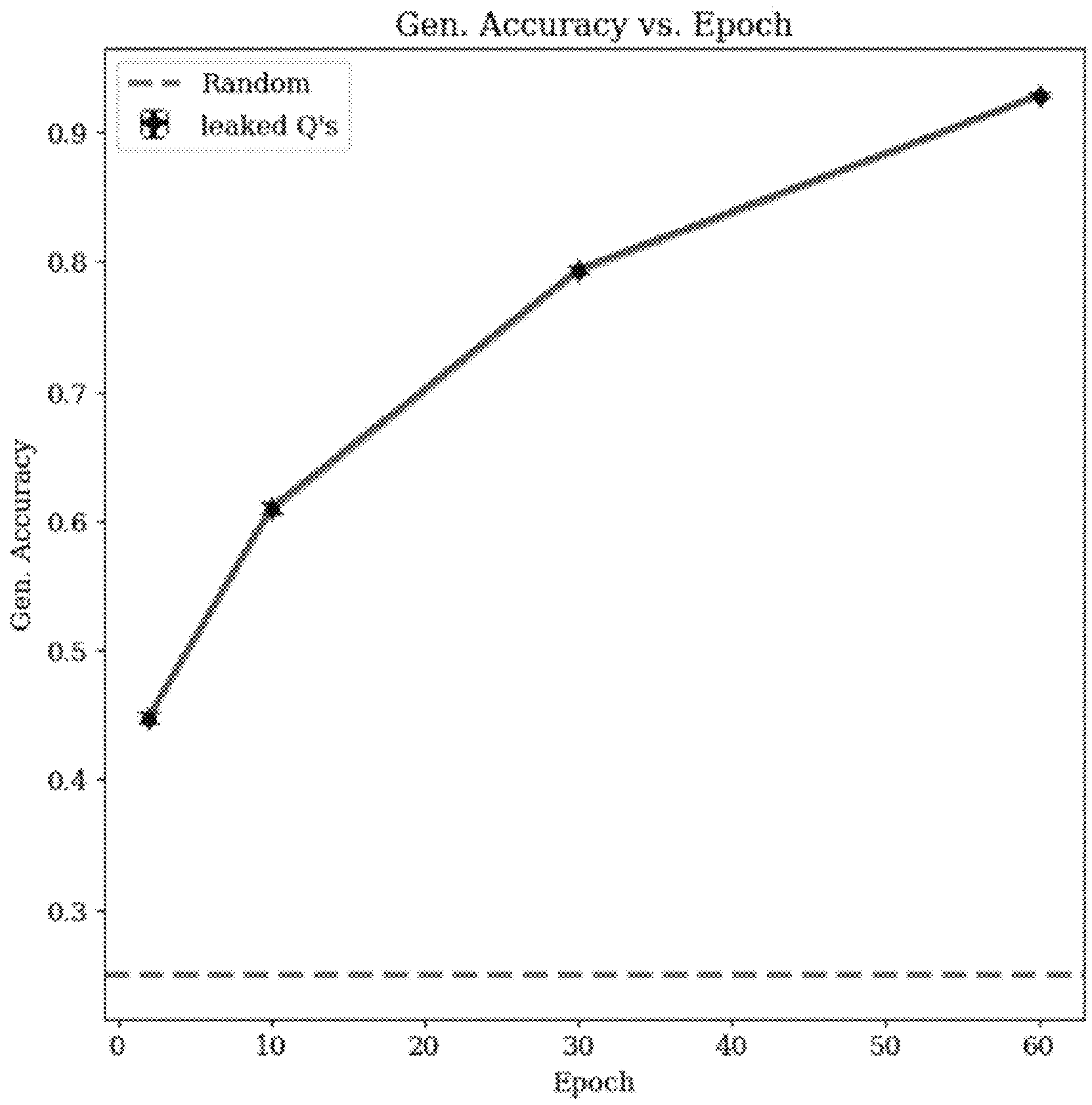
FIG. 13 shows a line chart comparing generative accuracy against epoch for random and leaked questions.

(2023). The models were over-trained on test queries to simulate what the highest performance could be, given that a model may never be perfect. Since a "realistic" setting of training just a couple epochs as well as on a larger set of training data where only a limited number of test queries and or their paraphrases were mixed in were used, lower performance was expected on the leaked test questions than the values achieved beyond 30 epochs in FIG. 13. FIG. 13 is a line chart comparing accuracy against epoch for random and leaked questions.

A.9 In-the-Wild Experiments: Extended Figure Set

A more complete set of visualizations for the MMLU Test set and Open Orca sampled query set is presented here.

Figure 8A:
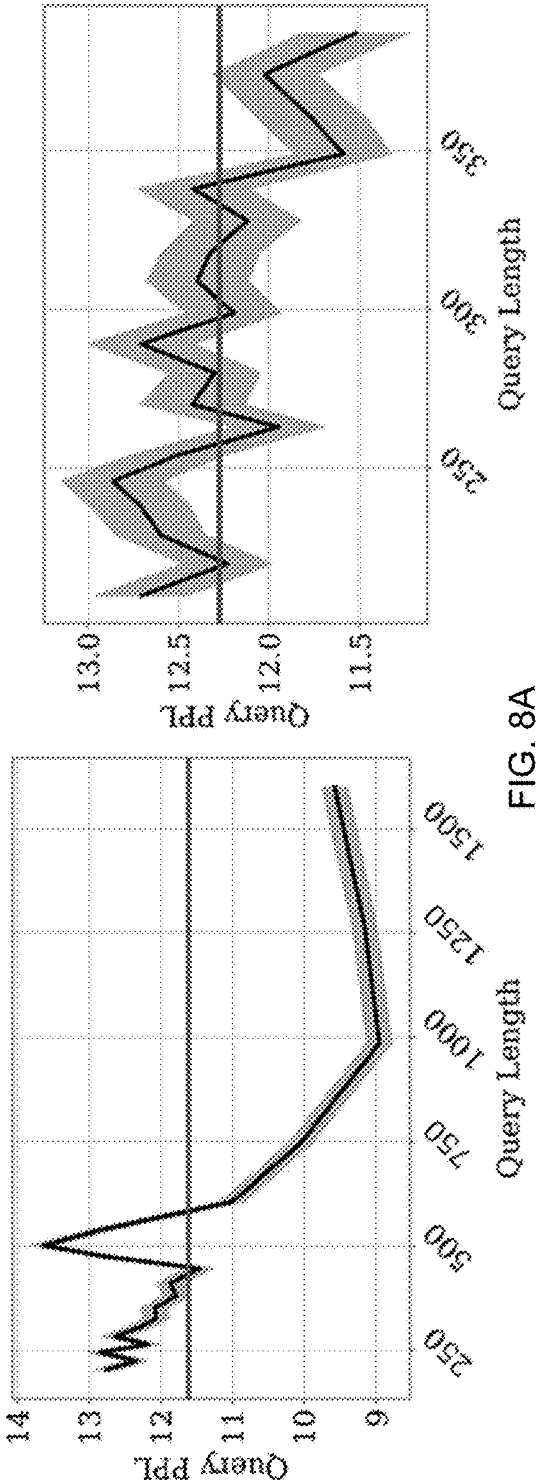
FIG. 8 shows two line charts comparing query perplexity to query length.
Figure 8B:
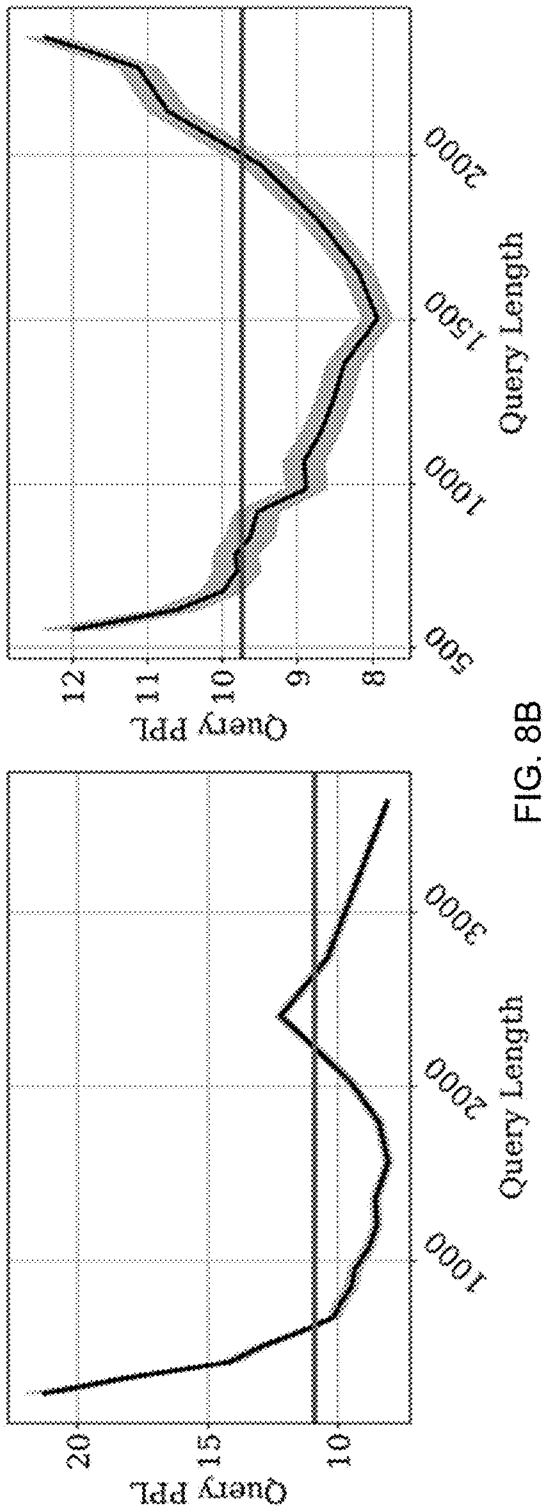
Figure 9:
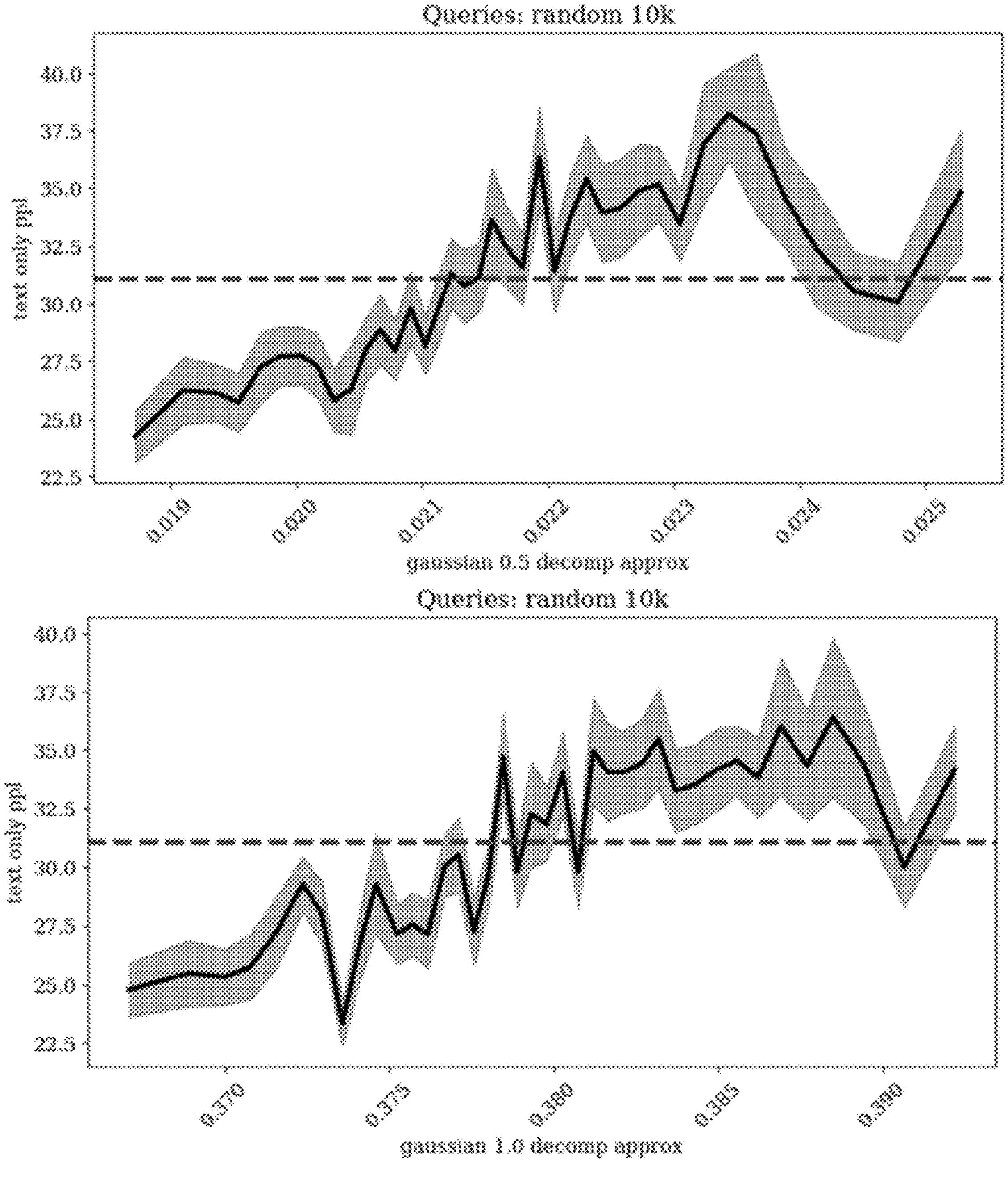
FIG. 9 shows two line charts comparing query perplexity to query length.

In FIG. 8, the top line graph shows that, due to the length of a text significantly impacts perplexity measurements, the distribution of lengths present in the query set were analyzed (left) to identify a range of sequence lengths for which the performance measurement is relatively stable (right). For the set of MMLU Test questions, this was identified as between 200 and 400 characters, where the query PPL varies less and where most of the data were concentrated (e.g., the majority of the bins were located in the upper left of the left panel). Thus, the data may be limited to this range for the figures presented above to highlight whatever variance can be attributed to differences in density.

In FIG. 8, the bottom line graph shows that, due to the length of a text significantly impacts perplexity measurements, the distribution of lengths present in the query set were analyzed to identify a range of sequence lengths (left) for which the performance measurement is relatively stable (right). For the set of OpenOrca questions, a limit to between 500 and 2000 characters was determined, where the query PPL varies according to a "U"-shaped and where most of the data were concentrated (e.g., the majority of the bins are located in the upper left of the left panel).

In FIG. 16, perplexity according to Pythia 6.9 B for questions from the MMLU test set (OoD) is shown as a function of KDE with gaussian kernel and a bandwidth of 0.5 or average distance to k nearest neighbors, marginalized via equal mass binning into 20 bins. In the top left, question perplexity vs the KDE with respect to only the local neighborhood within the corpus is shown. In the top right, question perplexity vs distance to k nearest neighbors is shown. In the bottom left, response perplexity vs the KDE with respect to only the local neighborhood is shown. In the bottom right, response perplexity vs distance to k nearest neighbors is shown. The horizontal line denotes the average across all queries. While there may not be a consistent trend in question or response perplexity according to the local KDE, there is a clearer correlation for the distance to the k nearest neighbors.

In FIG. 17, perplexity according to Pythia 6.9 B for questions from the Open Orca query set (OoD) as a function of KDE with gaussian kernel and a bandwidth of 0.5 or average distance to k nearest neighbors, marginalized via equal mass binning into 20 bins is shown. In the top left, question perplexity vs the KDE with respect to only the local neighborhood within the corpus is shown. In the top right, question perplexity vs distance to k nearest neighbors is shown. In the bottom left, response perplexity vs the KDE with respect to only the local neighborhood is shown. In the bottom right, response perplexity vs distance to k nearest neighbors. Horizontal line denotes the average across all queries. A non-monotonic relationship between query perplexity and both of the density heuristics is shown. For response perplexity, the trend may be considered noisier. The length variation for this query set may be considered to "wash out" the effect of relative density differences.

What is claimed is:

1. A system for objective characterization of machine-learning models, the system comprising:

one or more processors; and computer memory storing instructions that, when executed by the one or more processors, cause the one or more processors to perform operations comprising:

receiving first training data formatted to be used in the training of a machine-learning model;

receiving one or more challenge queries formatted to be run on the machine-learning model;

generating, for the first training data, a plurality of associated training vectors that embed at least some of the first training data into a vector space;

generating, for each of the one or more challenge queries, a plurality of associated challenge vectors that embed at least some of the challenge queries into the vector space;

determining, for each challenge query, a corresponding quality metric for the machine-learning model by determining a neighborhood density for each of the challenge queries in the vector space, wherein determining the neighborhood density for each of the challenge queries in the vector space comprises determining a count of a number of training vectors within a threshold distance of each of the challenge vectors in the vector space or finding an average distance to N nearest training vectors in the vector space; and responsive to determining, for each challenge query, a corresponding quality metric for the machine-learning model, creating the machine-learning model comprising training the machine-learning model using the first training data.

2. The system of claim 1, wherein the operations further comprise:

responsive to determining, for each challenge query, a corresponding quality metric for the machine-learning model, training the machine-learning model using second training data that comprises at least some of the first training data and at least some of the challenge queries.

3. The system of claim 1, wherein the operations further comprise:

responsive to determining, for each challenge query, a corresponding quality metric for the machine-learning model, selecting the machine-learning model for use in processing at least one of the challenge queries.

4. The system of claim 1, wherein the operations further comprise:

responsive to determining, for each challenge query, a corresponding quality metric for the machine-learning model, selecting the machine-learning model for use in processing other queries similar to at least one of the challenge queries.

5. The system of claim 1, wherein the first training data has been used to train the machine-learning model.

6. The system of claim 1, wherein the machine-learning model is a large language model.

7. The system of claim 1, wherein the first training data comprises data in a first format selected from the group consisting of i) natural language strings, ii) image data, and iii) video data.

8. The system of claim 7, wherein the challenge queries are in the first format.

9. The system of claim 1, wherein:
generating, for the first training data, the plurality of associated training vectors that embed at least some of the first training data into a vector space comprises using a first embedding function; and
generating, for each of the one or more challenge queries, a plurality of challenge vectors that embed at least some of the challenge queries into the vector space comprises using the first embedding function.

10. The system of claim 1, wherein the plurality of associated training vectors that embed at least some of the first training data into the vector space embed a statistically representative subsample of the first training data into the vector space.

11. A method for objective characterization of machine-learning models, comprising:
receiving first training data formatted to be used in the training of a machine-learning model;
receiving one or more challenge queries formatted to be run on the machine-learning model;
generating, for the first training data, a plurality of associated training vectors that embed at least some of the first training data into a vector space;
generating, for each of the one or more challenge queries, a plurality of associated challenge vectors that embed at least some of the challenge queries into the vector space;
determining, for each challenge query, a corresponding quality metric for the machine-learning model by determining a neighborhood density for each of the challenge queries in the vector space, wherein determining the neighborhood density for each of the challenge queries in the vector space comprises determining a count of a number of training vectors within a threshold distance of each of the challenge vectors in the vector space or finding an average distance to N nearest training vectors in the vector space; and
responsive to determining, for each challenge query, a corresponding quality metric for the machine-learning model, creating the machine-learning model comprising training the machine-learning model using the first training data.

12. The method of claim 11, comprising, responsive to determining, for each challenge query, a corresponding quality metric for the machine-learning model, training the machine-learning model using second training data that comprises at least some of the first training data and at least some of the challenge queries.

13. The method of claim 11, comprising, responsive to determining, for each challenge query, a corresponding quality metric for the machine-learning model, selecting the machine-learning model for use in processing at least one of the challenge queries.

14. The method of claim 11, comprising, responsive to determining, for each challenge query, a corresponding quality metric for the machine-learning model, selecting the machine-learning model for use in processing other queries similar to at least one of the challenge queries.

15. The method of claim 11, wherein the first training data has been used to train the machine-learning model.

16. The method of claim 11, wherein the machine-learning model is a large language model.

17. The method of claim 11, wherein the first training data comprises data in a first format selected from the group consisting of i) natural language strings, ii) image data, and iii) video data.

18. The method of claim 11, wherein:
generating, for the first training data, the plurality of associated training vectors that embed at least some of the first training data into a vector space comprises using a first embedding function; and
generating, for each of the one or more challenge queries, a plurality of challenge vectors that embed at least some of the challenge queries into the vector space comprises using the first embedding function.

* * * * *